US012684082B2

(12) United States Patent
Hayashi

(10) Patent No.: US 12,684,082 B2
(45) Date of Patent: Jul. 14, 2026

(54) SYSTEM, INFORMATION PROCESSING APPARATUS, AND CONTROL METHOD OF THE SAME

(71) Applicant: CANON KABUSHIKI KAISHA, Tokyo (JP)

(72) Inventor: Kimio Hayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/599,054

(22) Filed: Mar. 7, 2024

(65) Prior Publication Data

US 2024/0214505 A1     Jun. 27, 2024

Related U.S. Application Data

(63) Continuation of application No. 17/936,287, filed on Sep. 28, 2022, now Pat. No. 11,956,406.

(30) Foreign Application Priority Data

Sep. 30, 2021     (JP) ................................. 2021-161000

(51) Int. Cl.
H04N 1/60         (2006.01)
H04N 1/50         (2006.01)

(52) U.S. Cl.
CPC ............. *H04N 1/6033* (2013.01); *H04N 1/50* (2013.01)

(58) Field of Classification Search
CPC ......... H04N 1/6033; H04N 1/50; H04N 1/603
See application file for complete search history.

(56) References Cited

U.S. PATENT DOCUMENTS

| | | | | |
|---|---|---|---|---|
| 6,519,050 B1* | 2/2003 | Eintracht | ................. | H04N 1/62 |
| | | | | 358/1.9 |
| 6,943,917 B2* | 9/2005 | Tamagawa | ........... | H04N 1/6055 |
| | | | | 358/1.9 |
| 8,743,421 B1* | 6/2014 | Ross, Jr. | .................. | H04N 1/54 |
| | | | | 358/1.9 |
| 9,686,445 B2* | 6/2017 | Yamamoto | ......... | H04N 1/00045 |
| 2003/0101269 A1* | 5/2003 | Choi | ....................... | G06F 9/544 |
| | | | | 709/228 |

(Continued)

FOREIGN PATENT DOCUMENTS

| | | | | |
|---|---|---|---|---|
| CA | 2700848 A1 * | 4/2009 | ........... | H04N 1/6033 |
| CN | 107613158 A | 1/2018 | | |

(Continued)

*Primary Examiner* — Ted W Barnes
(74) *Attorney, Agent, or Firm* — Canon U.S.A., Inc. IP Division

(57)         ABSTRACT

A system for performing color validation by comparing a color measurement result of a chart and a color reference, the system including a first information processing apparatus, wherein the first information processing apparatus includes a colorimetric setting for performing color validation by comparing a color measurement result of a chart and a color reference, a transmission unit configured to transmit screen information of a screen for receiving a chart printing instruction, a receiving unit configured to receive the colorimetric setting and the chart printing instruction, and a generation unit configured to generate print data of a chart based on the colorimetric setting and the chart printing instruction.

19 Claims, 22 Drawing Sheets

| | | | | | |
|---|---|---|---|---|---|
| Validation result | | | | | 302 / 300 |

701 — [ Open ] [ Download ]⁷⁰² [ Delete ] —703

700 —

| Result | Date | Test specification | Printer | Test condition | Test ID |
|---|---|---|---|---|---|
| ✓ Pass | yyyy-mm-dd | FOGRA xxxx-yyyy | AAA printer | Coated, 100, 600dpi | 000001 |
| ✓ Pass | yyyy-mm-dd | FOGRA xxxx-yyyy | BBB printer | Uncoated, 90, 600dpi | 000002 |
| ✗ Failed | yyyy-mm-dd | GRACOL bbbb-cccc | AAA printer | Coated, 100, 1200dpi | 000003 |
| ✓ Pass | yyyy-mm-dd | FOGRA dddd-eeee | CCC printer | Uncoated, 90, 600dpi | 000004 |
| ✓ Pass | yyyy-mm-dd | Japan Color ffff-ggg | AAA printer | Coated, 100, 1200dpi | 000005 |
| ✓ Pass | yyyy-mm-dd | Custom hhhh-iiii | BBB printer | Coated, 100, 1200dpi | 000006 |
| ✓ Pass | yyyy-mm-dd | Custom jjjj-kkkk | AAA printer | Uncoated, 90, 600dpi | 000007 |
| ✗ Failed | yyyy-mm-dd | FOGRA llll-mmmm | CCC printer | Coated, 100, 600dpi | 000008 |
| ✗ Failed | yyyy-mm-dd | Japan Color nnn-ooo | AAA printer | Uncoated, 90, 600dpi | 000009 |
| ✓ Pass | yyyy-mm-dd | GRACOL bbbb-cccc | BBB printer | Coated, 100, 1200dpi | 000010 |
| ✓ Pass | yyyy-mm-dd | Japan Color ffff-ggg | CCC printer | Uncoated, 90, 600dpi | 000011 |

(56)  References Cited

U.S. PATENT DOCUMENTS

| | | | | |
|---|---|---|---|---|
| 2005/0062753 A1* | 3/2005 | Kitazawa | H04N 1/6033 | |
| | | | | 345/589 |
| 2005/0264640 A1* | 12/2005 | Kitazawa | H04N 1/6055 | |
| | | | | 347/171 |
| 2006/0215195 A1* | 9/2006 | Chan | G01J 3/46 | |
| | | | | 358/1.9 |
| 2010/0085587 A1* | 4/2010 | Hayward | H04N 1/6033 | |
| | | | | 358/1.9 |
| 2011/0069333 A1* | 3/2011 | Katayama | H04N 1/6055 | |
| | | | | 358/1.9 |
| 2011/0075223 A1* | 3/2011 | Katayama | H04N 1/6088 | |
| | | | | 358/3.23 |
| 2012/0050770 A1* | 3/2012 | Katayama | H04N 1/6033 | |
| | | | | 358/1.9 |
| 2012/0075645 A1* | 3/2012 | Katayama | H04N 1/6055 | |
| | | | | 358/1.9 |
| 2012/0081722 A1* | 4/2012 | Katayama | G06K 15/1878 | |
| | | | | 358/1.9 |
| 2012/0268755 A1* | 10/2012 | St. Martin | H04N 1/6033 | |
| | | | | 358/1.9 |
| 2012/0327435 A1* | 12/2012 | Ishii | H04N 1/6033 | |
| | | | | 358/1.9 |
| 2014/0063515 A1* | 3/2014 | Sugita | G06K 15/027 | |
| | | | | 358/1.9 |
| 2014/0355017 A1* | 12/2014 | Sugita | H04N 1/6038 | |
| | | | | 358/1.9 |
| 2017/0094125 A1* | 3/2017 | Yamamoto | H04N 1/6033 | |
| 2017/0208217 A1* | 7/2017 | Soriano | H04N 1/00061 | |
| 2018/0167534 A1* | 6/2018 | Satoh | H04N 1/00045 | |
| 2019/0260910 A1* | 8/2019 | Maeda | H04N 1/6052 | |
| 2019/0260911 A1* | 8/2019 | Toriyabe | H04N 1/603 | |
| 2020/0064196 A1* | 2/2020 | Inada | H04N 1/6055 | |
| 2022/0156019 A1* | 5/2022 | Kanamoto | G06F 3/1259 | |
| 2022/0156020 A1* | 5/2022 | Iida | G06F 3/1287 | |
| 2022/0283762 A1* | 9/2022 | Hayashi | G06T 7/0004 | |

FOREIGN PATENT DOCUMENTS

| | | | | |
|---|---|---|---|---|
| CN | 109582252 A | 4/2019 | | |
| CN | 109992224 A | 7/2019 | | |
| EP | 2696568 A1 * | 2/2014 | | H04N 1/6033 |
| EP | 3462723 A1 * | 4/2019 | | H04N 1/6044 |
| EP | 3614658 A1 * | 2/2020 | | G06T 7/90 |
| EP | 4011635 A1 * | 6/2022 | | G06F 3/1282 |
| JP | 2009239529 A * | 10/2009 | | H04N 1/6033 |
| JP | 5462756 B2 * | 4/2014 | | H04N 1/6055 |
| JP | 5508993 B2 * | 6/2014 | | H04N 1/6033 |
| JP | 6422923 B2 * | 11/2018 | | H04N 1/6033 |
| JP | 2019066961 A | 4/2019 | | |
| JP | 2019087962 A * | 6/2019 | | H04N 1/6097 |
| WO | WO-2021024733 A1 * | 2/2021 | | G06F 3/1282 |
| WO | WO-2021130012 A1 * | 7/2021 | | G06F 16/904 |

* cited by examiner

Figure 5:
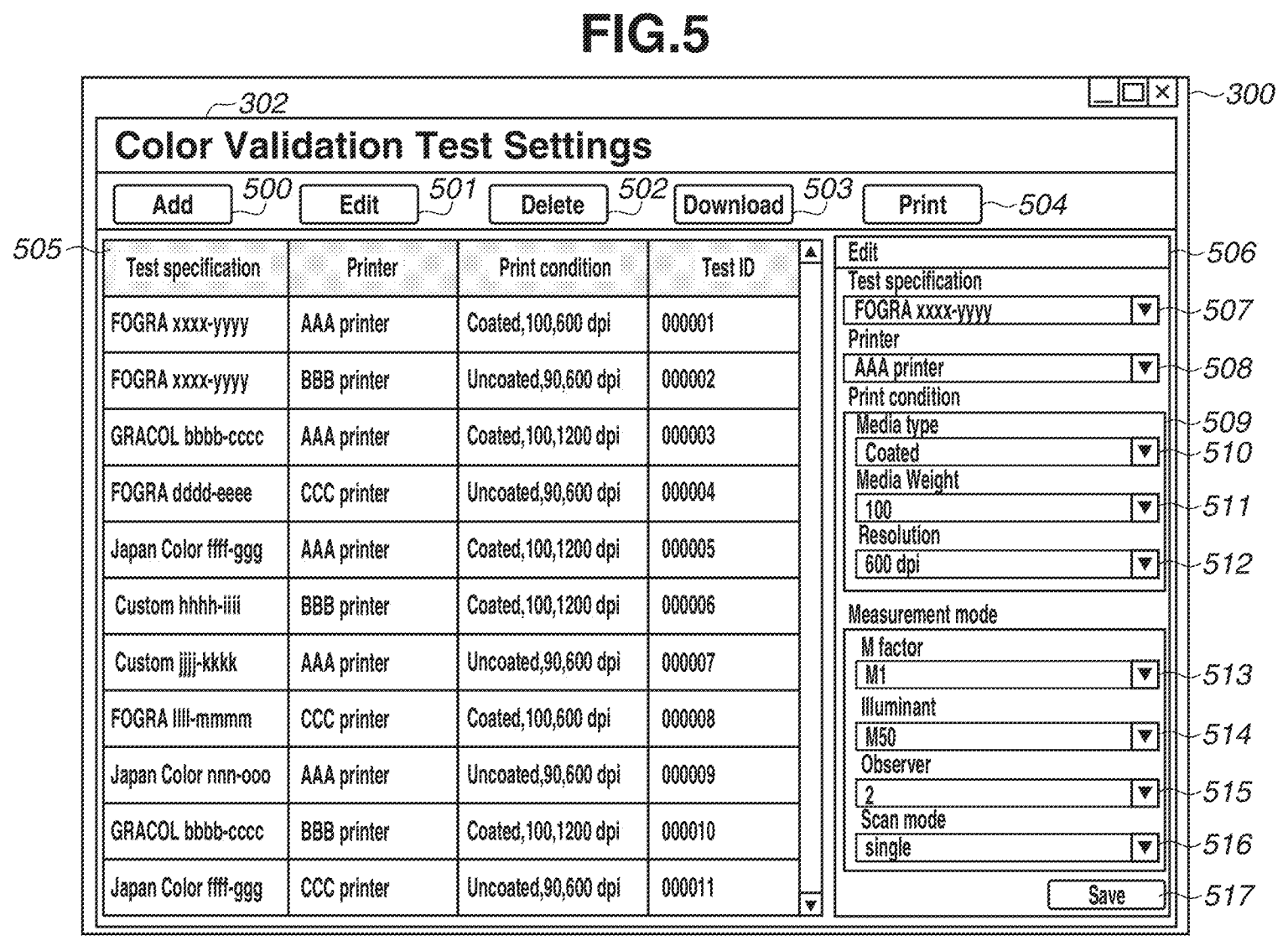

Color Validation Test Settings

| Test specification | Printer | Print condition | Test ID |
|---|---|---|---|
| FOGRA xxxx-yyyy | AAA printer | Coated,100,600 dpi | 000001 |
| FOGRA xxxx-yyyy | BBB printer | Uncoated,90,600 dpi | 000002 |
| GRACOL bbbb-cccc | AAA printer | Coated,100,1200 dpi | 000003 |
| FOGRA dddd-eeee | CCC printer | Uncoated,90,600 dpi | 000004 |
| Japan Color ffff-ggg | AAA printer | Coated,100,1200 dpi | 000005 |
| Custom hhhh-iiii | BBB printer | Coated,100,1200 dpi | 000006 |
| Custom jjjj-kkkk | AAA printer | Uncoated,90,600 dpi | 000007 |
| FOGRA llll-mmmm | CCC printer | Coated,100,600 dpi | 000008 |
| Japan Color nnn-ooo | AAA printer | Uncoated,90,600 dpi | 000009 |
| GRACOL bbbb-cccc | BBB printer | Coated,100,1200 dpi | 000010 |
| Japan Color ffff-ggg | CCC printer | Uncoated,90,600 dpi | 000011 |

Add 500   Edit 501   Delete 502   Download 503   Print 504

Edit

Test specification
FOGRA xxxx-yyyy ▼  506

Printer
AAA printer ▼  507

Print condition
508

Media type
Coated ▼  509

Media Weight
100  510

Resolution
600 dpi ▼  511

Measurement mode
512

M factor
M1 ▼  513

Illuminant
M50 ▼  514

Observer
2 ▼  515

Scan mode
single ▼  516

Save  517

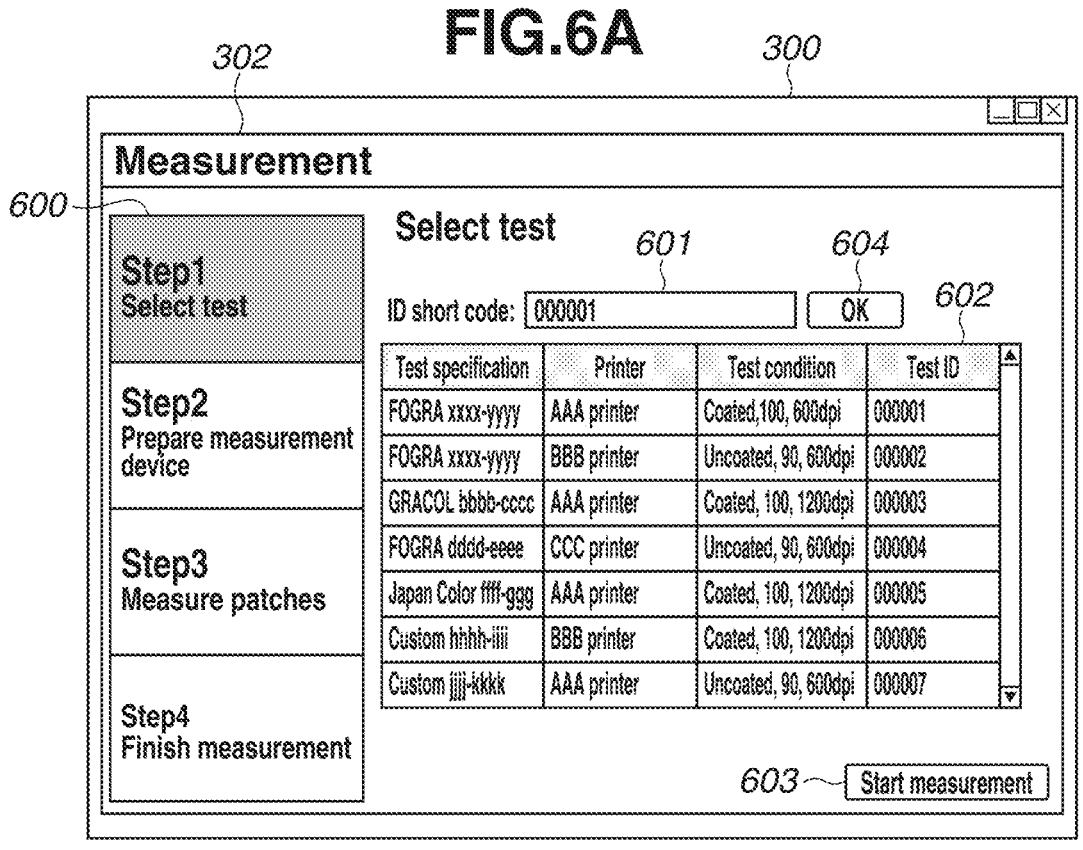

*302*     *300*

Measurement

*600*

| Step1 |
|-------|
| Select test |

| Step2 |
|-------|
| Prepare measurement device |

| Step3 |
|-------|
| Measure patches |

| Step4 |
|-------|
| Finish measurement |

Select test    *601*    *604*

ID short code: [ 000001 ]    [ OK ]    *602*

| Test specification | Printer | Test condition | Test ID |
|---|---|---|---|
| FOGRA xxxx-yyyy | AAA printer | Coated,100, 600dpi | 000001 |
| FOGRA xxxx-yyyy | BBB printer | Uncoated, 90, 600dpi | 000002 |
| GRACOL bbbb-cccc | AAA printer | Coated, 100, 1200dpi | 000003 |
| FOGRA dddd-eeee | CCC printer | Uncoated, 90, 600dpi | 000004 |
| Japan Color ffff-ggg | AAA printer | Coated, 100, 1200dpi | 000005 |
| Custom hhhh-iiii | BBB printer | Coated, 100, 1200dpi | 000006 |
| Custom jjjj-kkkk | AAA printer | Uncoated, 90, 600dpi | 000007 |

*603* [ Start measurement ]

FIG.6B

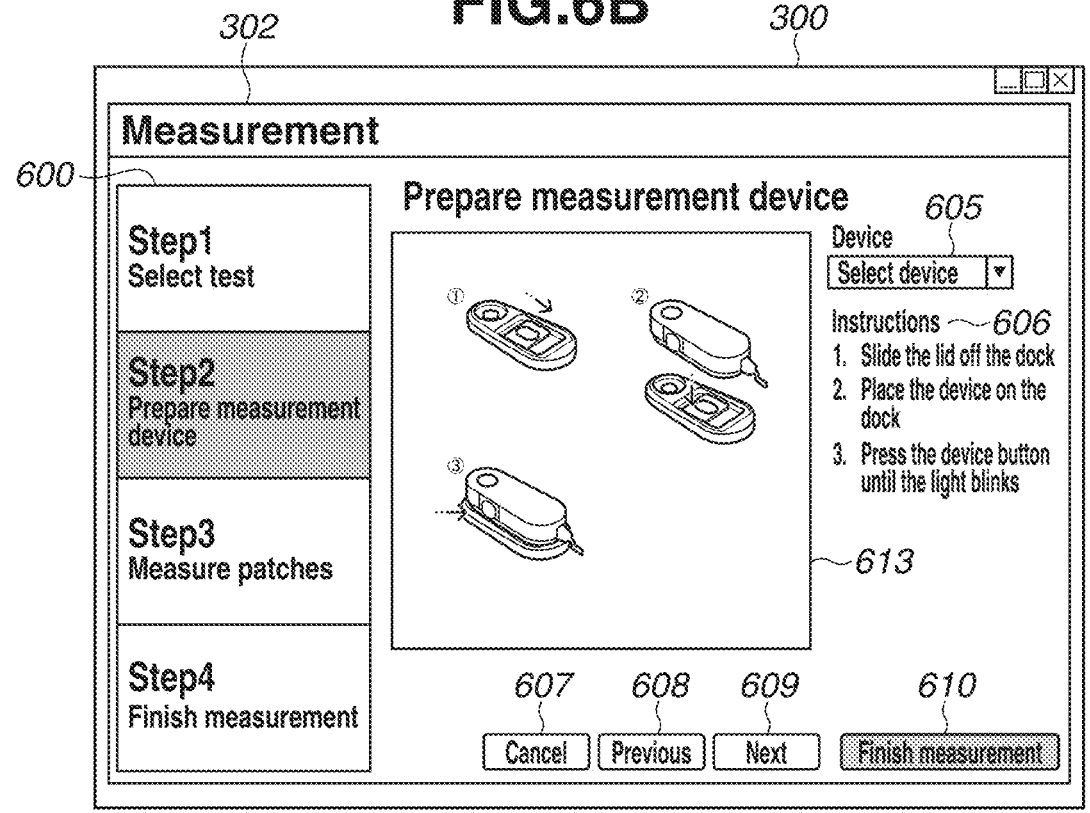

*302*     *300*

Measurement

*600*

| Step1 |
|-------|
| Select test |

| Step2 |
|-------|
| Prepare measurement device |

| Step3 |
|-------|
| Measure patches |

| Step4 |
|-------|
| Finish measurement |

Prepare measurement device    *605*

Device
[ Select device ▼ ]

Instructions ~*606*
1. Slide the lid off the dock
2. Place the device on the dock
3. Press the device button until the light blinks

~*613*

*607*   *608*   *609*    *610*

[ Cancel ] [ Previous ] [ Next ] [ Finish measurement ]

FIG.7A

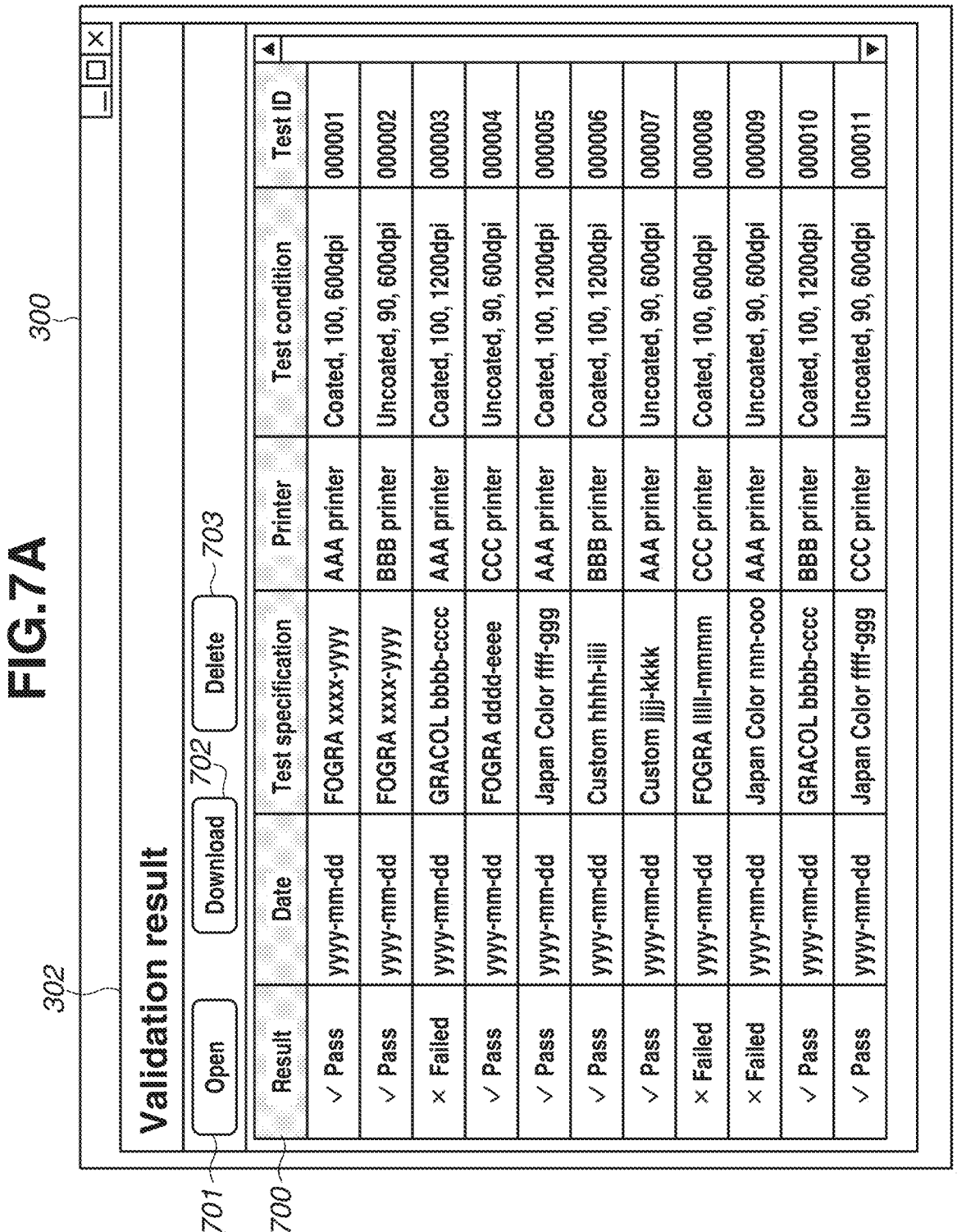

Validation result

| Result | Date | Test specification | Printer | Test condition | Test ID |
|---|---|---|---|---|---|
| ✓ Pass | yyyy-mm-dd | FOGRA xxxx-yyyy | AAA printer | Coated, 100, 600dpi | 000001 |
| ✓ Pass | yyyy-mm-dd | FOGRA xxxx-yyyy | BBB printer | Uncoated, 90, 600dpi | 000002 |
| ✕ Failed | yyyy-mm-dd | GRACOL bbbb-cccc | AAA printer | Coated, 100, 1200dpi | 000003 |
| ✓ Pass | yyyy-mm-dd | FOGRA dddd-eeee | CCC printer | Uncoated, 90, 600dpi | 000004 |
| ✓ Pass | yyyy-mm-dd | Japan Color ffff-ggg | AAA printer | Coated, 100, 1200dpi | 000005 |
| ✓ Pass | yyyy-mm-dd | Custom hhhh-iii | BBB printer | Coated, 100, 1200dpi | 000006 |
| ✓ Pass | yyyy-mm-dd | Custom jjjj-kkkk | AAA printer | Uncoated, 90, 600dpi | 000007 |
| ✕ Failed | yyyy-mm-dd | FOGRA llll-mmmm | CCC printer | Coated, 100, 600dpi | 000008 |
| ✕ Failed | yyyy-mm-dd | Japan Color nnn-ooo | AAA printer | Uncoated, 90, 600dpi | 000009 |
| ✓ Pass | yyyy-mm-dd | GRACOL bbbb-cccc | BBB printer | Coated, 100, 1200dpi | 000010 |
| ✓ Pass | yyyy-mm-dd | Japan Color ffff-ggg | CCC printer | Uncoated, 90, 600dpi | 000011 |

Open    Download    Delete 300    302    701    700    702    703

Figure 8:
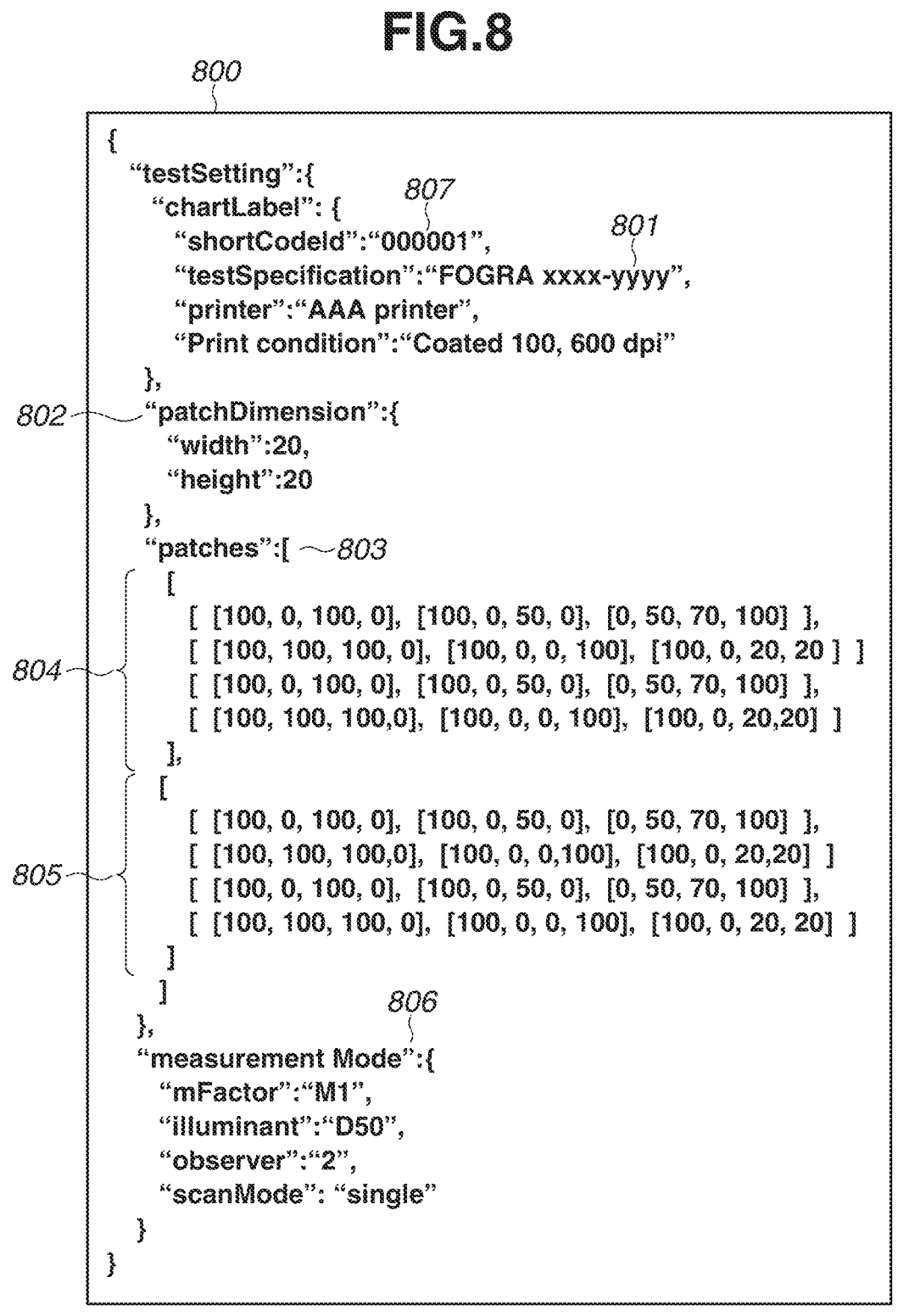

```
{
   "testSetting":{
      "chartLabel": {              807
         "shortCodeId":"000001",            801
         "testSpecification":"FOGRA xxxx-yyyy",
         "printer":"AAA printer",
         "Print condition":"Coated 100, 600 dpi"
      },
      "patchDimension":{                                    — 802
         "width":20,
         "height":20
      },
      "patches":[ ~803
       [
         [ [100, 0, 100, 0], [100, 0, 50, 0], [0, 50, 70, 100] ],
         [ [100, 100, 100, 0], [100, 0, 0, 100], [100, 0, 20, 20 ] ]       — 804
         [ [100, 0, 100, 0], [100, 0, 50, 0], [0, 50, 70, 100] ],
         [ [100, 100, 100,0], [100, 0, 0, 100], [100, 0, 20,20] ]
       ],
       [
         [ [100, 0, 100, 0], [100, 0, 50, 0], [0, 50, 70, 100] ],
         [ [100, 100, 100,0], [100, 0, 0,100], [100, 0, 20,20] ]       — 805
         [ [100, 0, 100, 0], [100, 0, 50, 0], [0, 50, 70, 100] ],
         [ [100, 100, 100, 0], [100, 0, 0, 100], [100, 0, 20, 20] ]
       ]
      ]                              806
   },
   "measurement Mode":{
      "mFactor":"M1",
      "illuminant":"D50",
      "observer":"2",
      "scanMode": "single"
   }
}
```

FIG.10

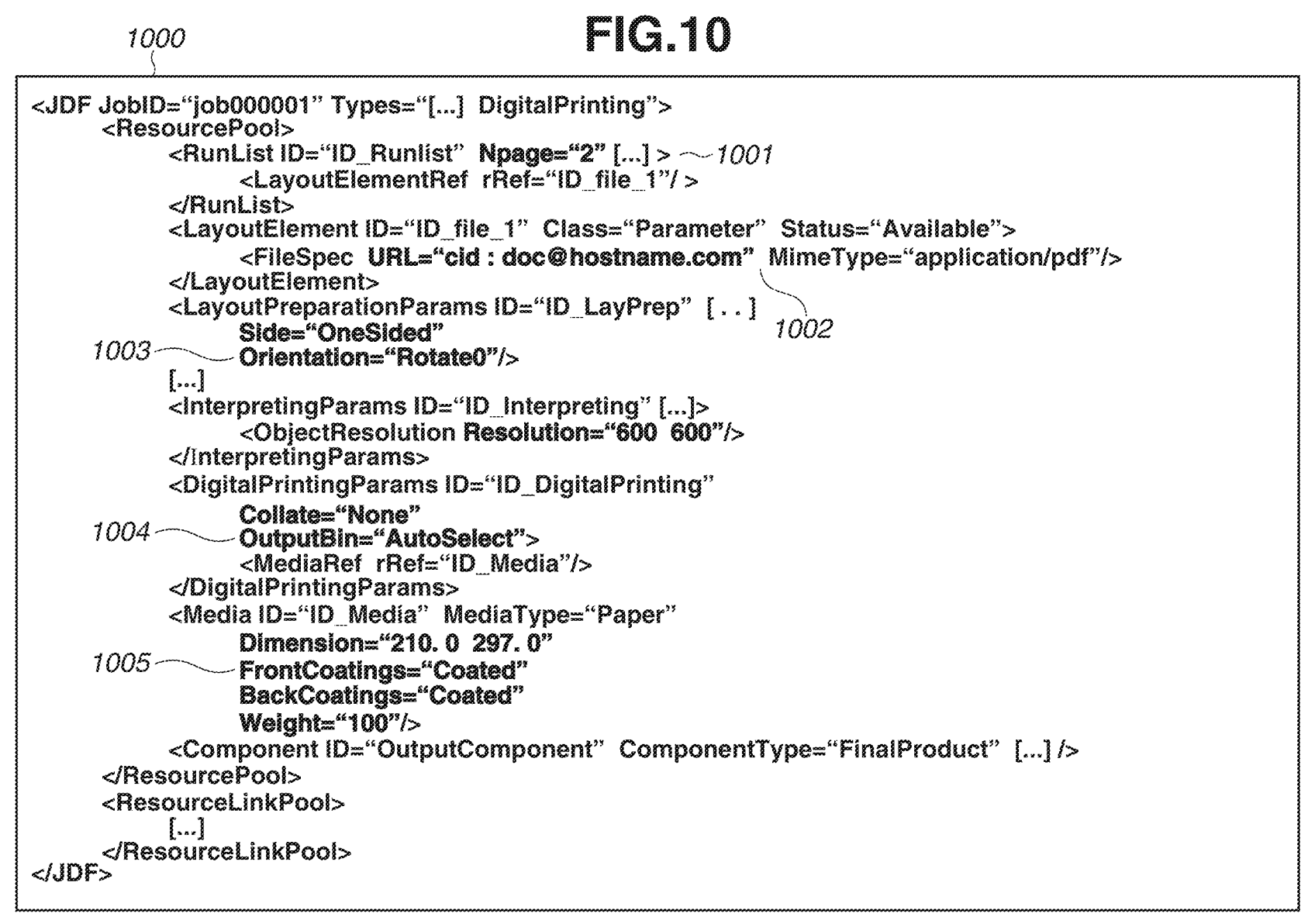

```
1000 ⟶ <JDF JobID="job000001" Types="[...] DigitalPrinting">
          <ResourcePool>
            <RunList ID="ID_Runlist" Npage="2" [...] > ⟶ 1001
              <LayoutElementRef rRef="ID_file_1"/>
            </RunList>
            <LayoutElement ID="ID_file_1" Class="Parameter" Status="Available">
              <FileSpec URL="cid : doc@hostname.com" MimeType="application/pdf"/>
            </LayoutElement>                                                    ⟍ 1002
            <LayoutPreparationParams ID="ID_LayPrep" [...]
              Side="OneSided"
      1003 ⟶   Orientation="Rotate0"/>
            [...]
            <InterpretingParams ID="ID_Interpreting" [...]>
              <ObjectResolution Resolution="600 600"/>
            </InterpretingParams>
            <DigitalPrintingParams ID="ID_DigitalPrinting"
              Collate="None"
      1004 ⟶   OutputBin="AutoSelect">
              <MediaRef rRef="ID_Media"/>
            </DigitalPrintingParams>
            <Media ID="ID_Media" MediaType="Paper"
              Dimension="210. 0 297. 0"
      1005 ⟶   FrontCoatings="Coated"
              BackCoatings="Coated"
              Weight="100"/>
            <Component ID="OutputComponent" ComponentType="FinalProduct" [...] />
          </ResourcePool>
          <ResourceLinkPool>
            [...]
          </ResourceLinkPool>
        </JDF>
```

FIG.11A

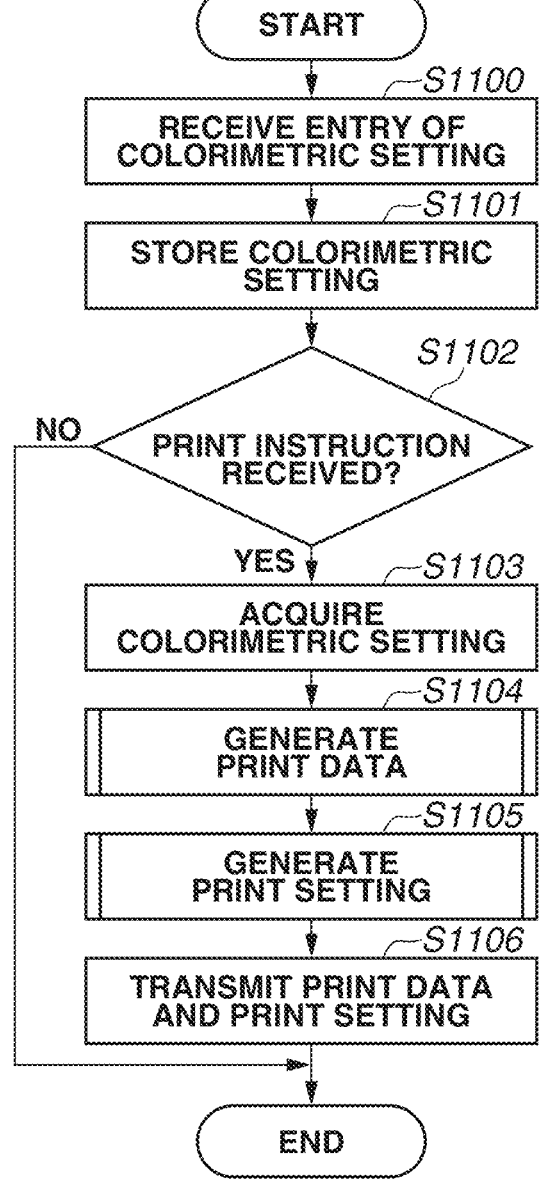

START

↓ *S1100*

RECEIVE ENTRY OF
COLORIMETRIC SETTING

↓ *S1101*

STORE COLORIMETRIC
SETTING

↓ *S1102*

PRINT INSTRUCTION
RECEIVED?

NO →

YES ↓ *S1103*

ACQUIRE
COLORIMETRIC SETTING

↓ *S1104*

GENERATE
PRINT DATA

↓ *S1105*

GENERATE
PRINT SETTING

↓ *S1106*

TRANSMIT PRINT DATA
AND PRINT SETTING

↓

END

FIG.11B

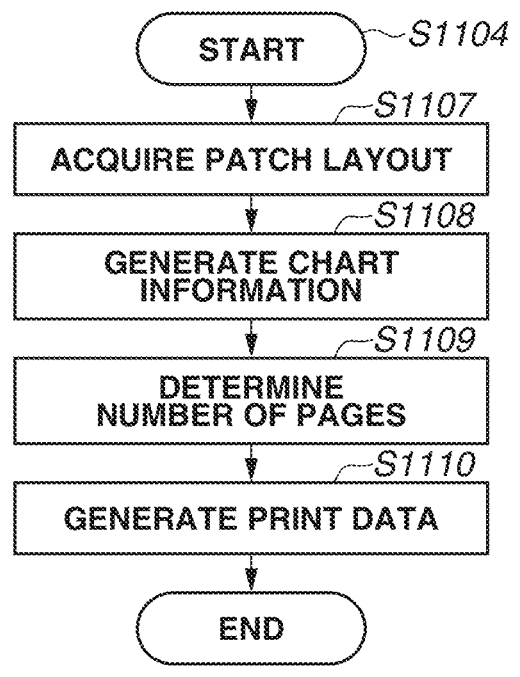

START ~ *S1104*

↓ *S1107*

ACQUIRE PATCH LAYOUT

↓ *S1108*

GENERATE CHART
INFORMATION

↓ *S1109*

DETERMINE
NUMBER OF PAGES

↓ *S1110*

GENERATE PRINT DATA

↓

END

FIG.11C

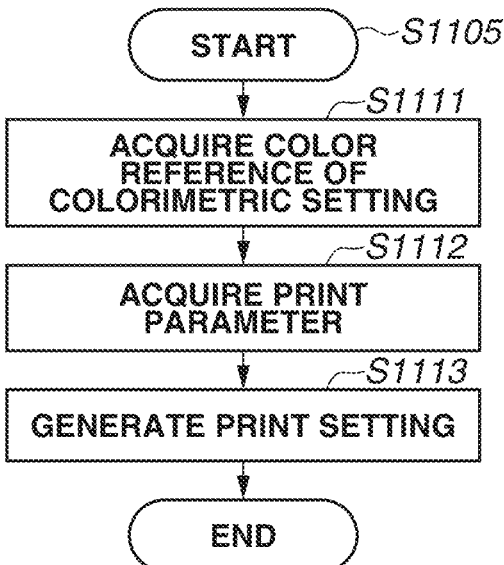

START ~ *S1105*

↓ *S1111*

ACQUIRE COLOR
REFERENCE OF
COLORIMETRIC SETTING

↓ *S1112*

ACQUIRE PRINT
PARAMETER

↓ *S1113*

GENERATE PRINT SETTING

↓

END

Figure 12:
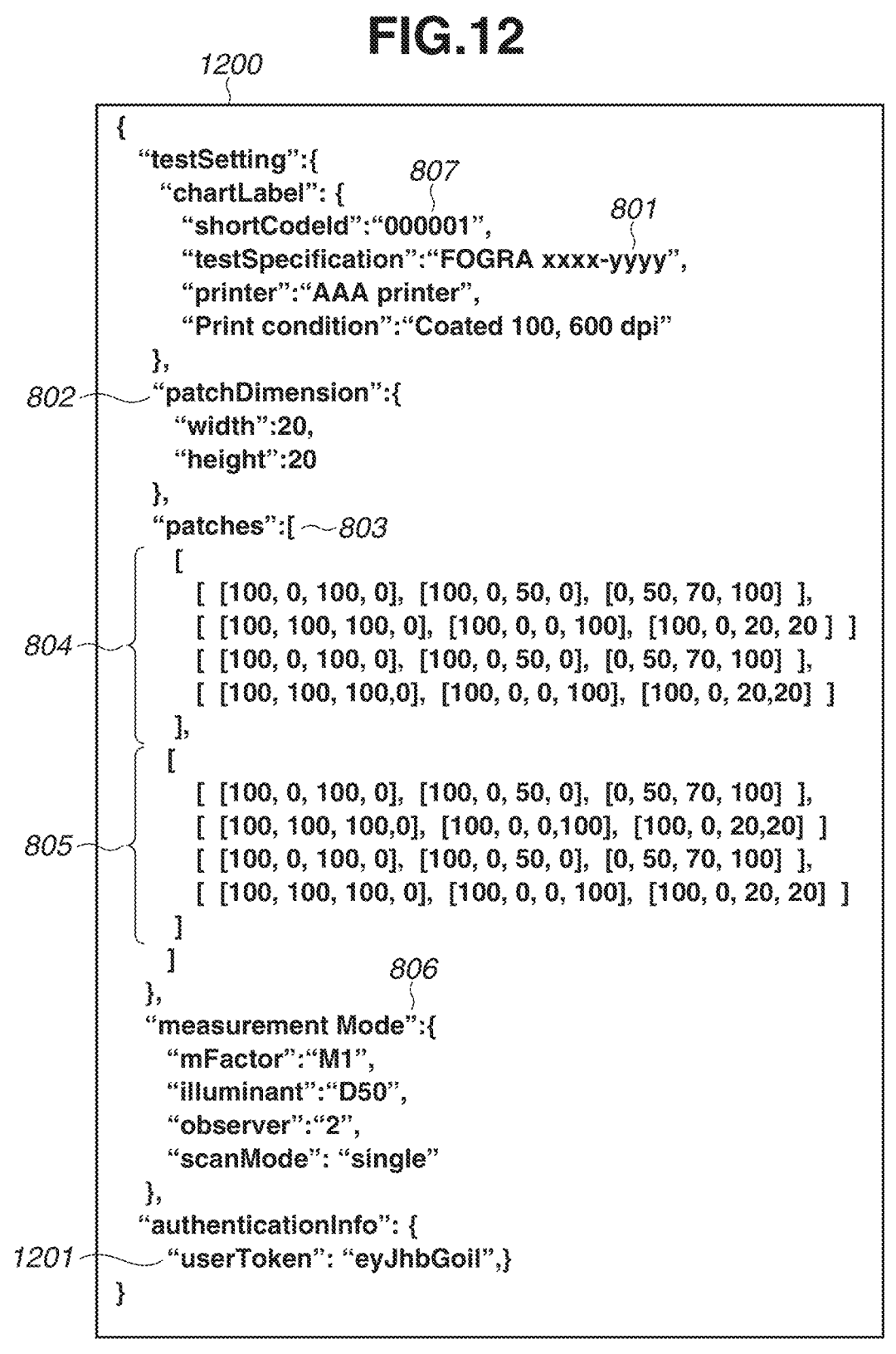

```
{
    "testSetting":{                    807
        "chartLabel": {                               801
            "shortCodeId":"000001",
            "testSpecification":"FOGRA xxxx-yyyy",
            "printer":"AAA printer",
            "Print condition":"Coated 100, 600 dpi"
        },
802 "patchDimension":{
            "width":20,
            "height":20
        },
        "patches":[  803
            [
                [ [100, 0, 100, 0], [100, 0, 50, 0], [0, 50, 70, 100] ],
                [ [100, 100, 100, 0], [100, 0, 0, 100], [100, 0, 20, 20 ] ]
804             [ [100, 0, 100, 0], [100, 0, 50, 0], [0, 50, 70, 100] ],
                [ [100, 100, 100,0], [100, 0, 0, 100], [100, 0, 20,20] ]
            ],
            [
                [ [100, 0, 100, 0], [100, 0, 50, 0], [0, 50, 70, 100] ],
                [ [100, 100, 100,0], [100, 0, 0,100], [100, 0, 20,20] ]
805             [ [100, 0, 100, 0], [100, 0, 50, 0], [0, 50, 70, 100] ],
                [ [100, 100, 100, 0], [100, 0, 0, 100], [100, 0, 20, 20] ]
            ]
        ]                          806
    },
    "measurement Mode":{
        "mFactor":"M1",
        "illuminant":"D50",
        "observer":"2",
        "scanMode": "single"
    },
    "authenticationInfo": {
1201     "userToken": "eyJhbGoil",}
}
```

1300

```
"test-patch": {
    "test-id": "000001",
    "patch-number": "1"
}
```

1301

```
"test-result": {
    "test-id": "000001",
    "result": "true",
    "lab-value": "[ [100, 0, 100, 0], [100, 0, 50, 0], [0, 50, 70, 100] ]",
    "error-code": "none"
}
```

1302

```
"test-result": {
    "test-id": "000001",
    "result": "false",
    "lab-value": "",
    "error-code": "12345"
}
```

Figure 14:
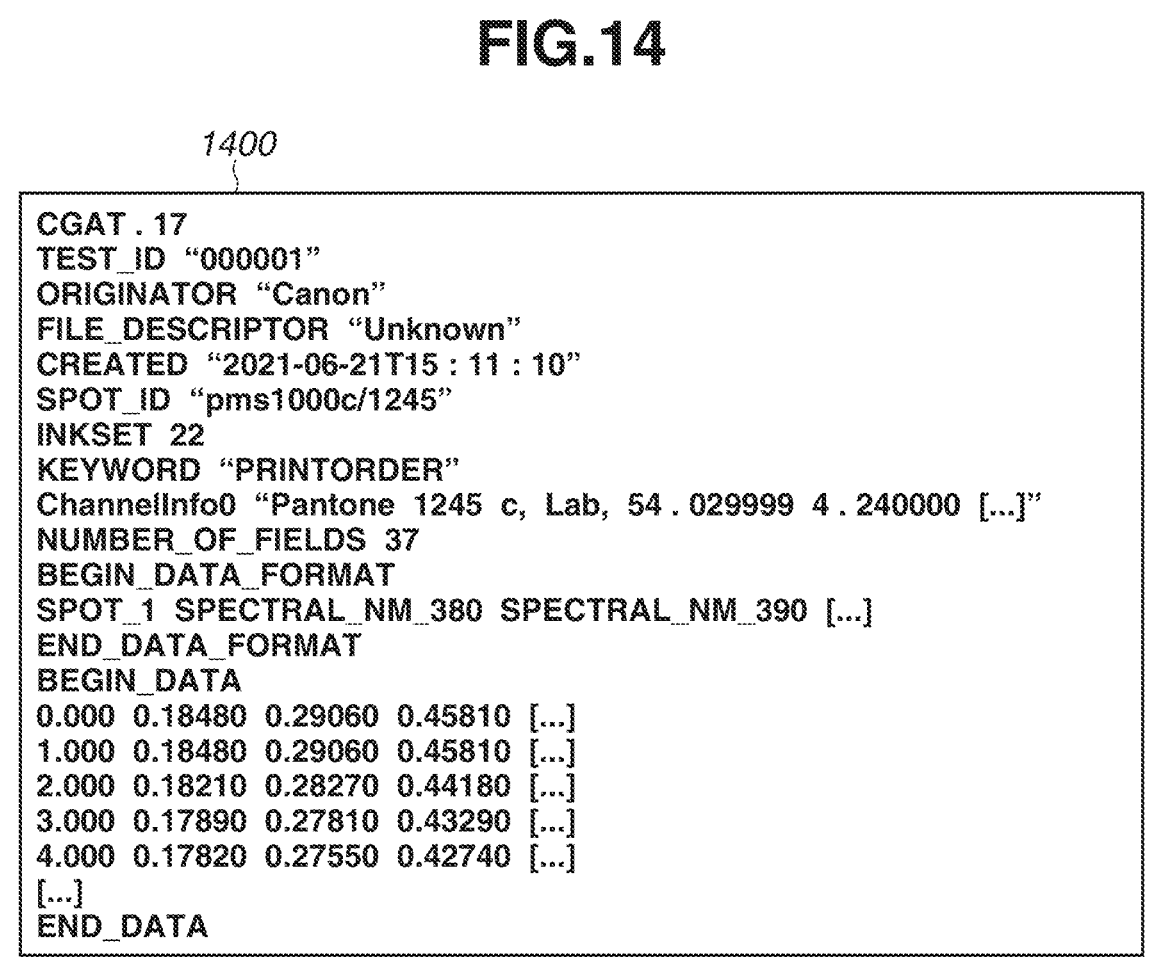

```
CGAT . 17
TEST_ID "000001"
ORIGINATOR "Canon"
FILE_DESCRIPTOR "Unknown"
CREATED "2021-06-21T15 : 11 : 10"
SPOT_ID "pms1000c/1245"
INKSET 22
KEYWORD "PRINTORDER"
ChannelInfo0 "Pantone 1245 c, Lab, 54 . 029999  4 . 240000 [...]"
NUMBER_OF_FIELDS 37
BEGIN_DATA_FORMAT
SPOT_1 SPECTRAL_NM_380 SPECTRAL_NM_390 [...]
END_DATA_FORMAT
BEGIN_DATA
0.000  0.18480  0.29060  0.45810  [...]
1.000  0.18480  0.29060  0.45810  [...]
2.000  0.18210  0.28270  0.44180  [...]
3.000  0.17890  0.27810  0.43290  [...]
4.000  0.17820  0.27550  0.42740  [...]
[...]
END_DATA
```

```
{
    "print-request": {
        "test-id": "000001",
    }
}
```

```
{
    "measurement-upload-request": {
        "test-id": "000001"
    }
}
```

SYSTEM, INFORMATION PROCESSING APPARATUS, AND CONTROL METHOD OF THE SAME

CROSS REFERENCE OF RELATED APPLICATIONS

This application is a continuation of U.S. patent application Ser. No. 17/936,287, filed Sep. 28, 2022, now U.S. Pat. No. 11,956,406, which claims the benefit of priority from Japanese Patent Application No. 2021-161000, filed Sep. 30, 2021, each of which are hereby incorporated by reference herein in their entirety.

BACKGROUND

Field of the Disclosure

The present disclosure generally relates to a technique for performing validation of the color quality of a printed material.

Description of the Related Art

In the commercial printing field, there have been recently growing importance of and a demand for a color validation process of periodically validating the color quality of an image forming apparatus. This is because, if a print output result fails to meet expectations from an outsourcer strict about color and a job is rejected, cost increases and a profit declines.

The color validation process includes steps such as settings related to color measurement and printing in color validation, printing of a chart including a plurality of color patches, color measurement of the chart, color validation executed by comparison between a color measurement result and a color reference, and the confirmation of a color validation result (for example, refer to Japanese Patent No. 6422923).

In some cases, color measurement in color validation and a print setting instruction are performed via an application or a web browser, and a chart printing instruction is performed via a printer driver.

In this case, in a series of operations related to color validation, for example, the user needs to switch an application to be used, which is unfriendly for users and is to be solved.

SUMMARY

The present disclosure aims to enhance the convenience of the user in a series of operations related to color validation.

According to an aspect of the present disclosure, a system for performing color validation by comparing a color measurement result of a chart and a color reference, the system including a first information processing apparatus, wherein the first information processing apparatus includes a colorimetric setting for performing color validation by comparing a color measurement result of a chart and a color reference, a transmission unit configured to transmit screen information of a screen for receiving a chart printing instruction, a receiving unit configured to receive the colorimetric setting and the chart printing instruction, and a generation unit configured to generate print data of a chart based on the colorimetric setting and the chart printing instruction.

Further features of the present disclosure will become apparent from the following description of exemplary embodiments with reference to the attached drawings.

BRIEF DESCRIPTION OF THE DRAWINGS

FIG. 1 is a block diagram illustrating an entire color validation system according to a first exemplary embodiment.

FIG. 3 is a functional block diagram of the color validation system according to the first exemplary embodiment.

FIG. 5 is a schematic diagram illustrating an example of a setting screen according to the first exemplary embodiment.

FIGS. 6A to 6D are schematic diagrams each illustrating an example of a color measurement screen according to the first exemplary embodiment.

FIGS. 7A and 7B are schematic diagrams each illustrating an example of a color validation screen according to the first exemplary embodiment.

FIG. 8 illustrates an example of a colorimetric setting according to the first exemplary embodiment.

FIG. 10 illustrates an example of a print setting according to the first exemplary embodiment.

FIGS. 11A, 11B, and 11C are flowcharts illustrating chart printing processing according to the first exemplary embodiment.

FIG. 12 illustrates an example of a chart color measurement request according to the first exemplary embodiment.

FIG. 14 illustrates an example of a color measurement result according to the first exemplary embodiment.

FIGS. 19A and 19B illustrate an example of a printing instruction and a color validation instruction according to the first exemplary embodiment.

DESCRIPTION OF THE EMBODIMENTS

Figure 2:
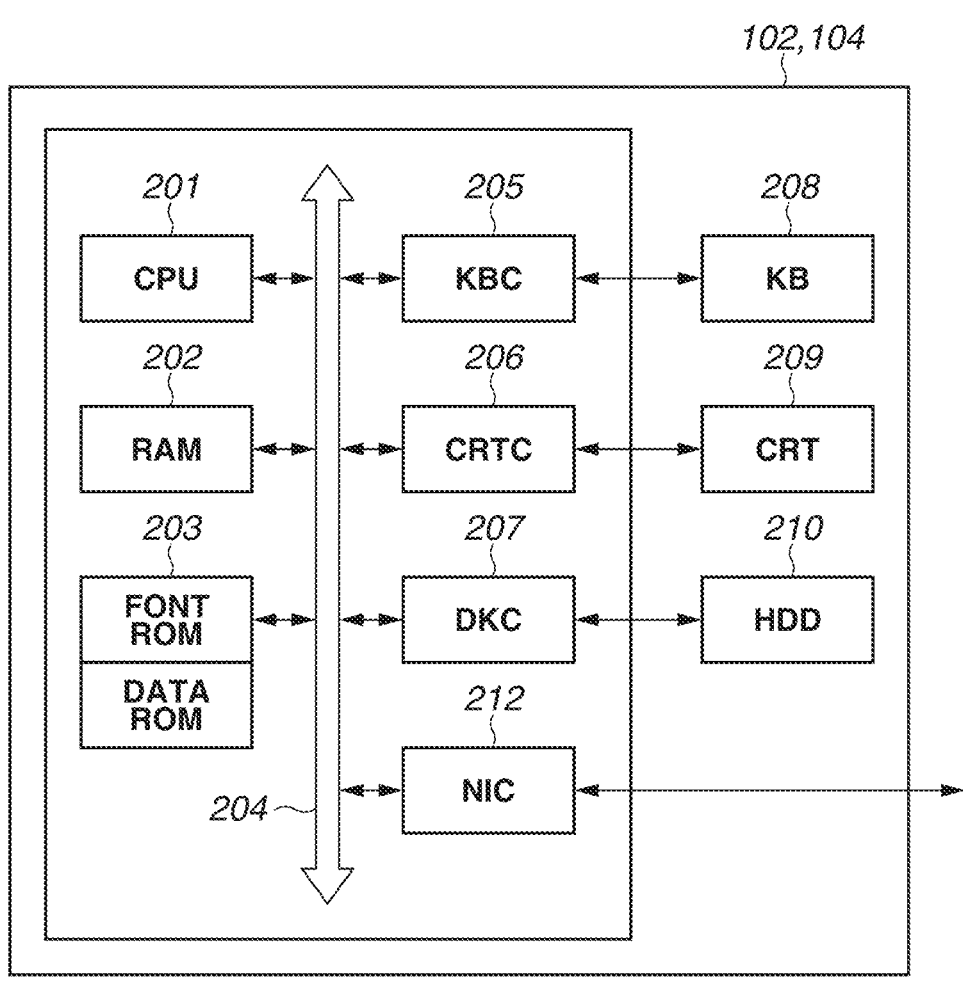
FIG. 2 is a hardware configuration diagram of an information processing apparatus according to the first exemplary embodiment.

Hereinafter, exemplary embodiments of the present disclosure will be described with reference to the drawings.

The following exemplary embodiments are not intended to limit the disclosure set forth in the appended claims, and not all the combinations of the features described in the exemplary embodiments are always essential to the solution of the disclosure.

A first exemplary embodiment will be described. The features of the present disclosure will be described by sequentially describing, using specific examples, a configuration of a color validation system for implementing a color validation process, printing of a chart, color measurement of a chart, and color validation. The configuration of the color validation system will be described with reference to FIGS. 1 to 7A and 7B.

Figure 1:
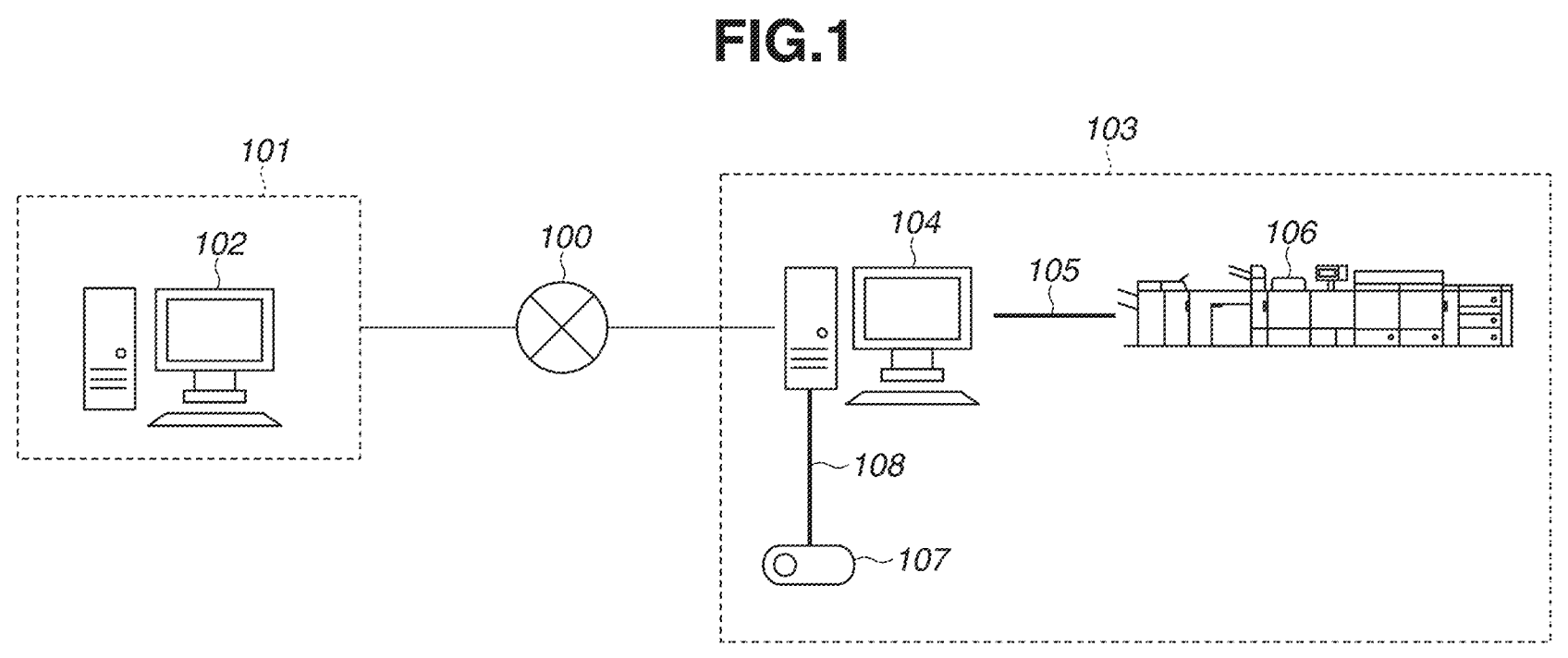

FIG. 1 is a block diagram illustrating a color validation system according to the present exemplary embodiment. The color validation system is broadly divided into a web system 101 and a printing business operator system 103. The web system 101 and the printing business operator system 103 are connected to each other via an internet 100. The web system 101 may be constructed on a cloud, or may be constructed on a company's own server.

Hereinafter, an internal configuration of the printing business operator system 103 will be described in detail. As illustrated in FIG. 1, an information processing apparatus 104 and an image forming apparatus 106 are connected to each other via a network 105. A color measurement device 107 is connected to these apparatuses via a serial bus 108. The image forming apparatus 106 is controlled under programs operating on the information processing apparatus 104, and generates a product by processing a print setting and print data that have been received from the web system 101.

FIG. 2 is a block diagram illustrating a configuration of an information processing apparatus (102, 104). In FIG. 2, a central processing unit (CPU) 201 includes one or more processors, circuitry, or combinations thereof, and executes a program of an operating system (OS) or a general-purpose application that is stored in a program read-only memory (ROM) of a ROM 203, or loaded from a hard disk drive (HDD) 210 onto a random access memory (RAM) 202. The ROM 203 includes a font ROM and a data ROM. The RAM 202 functions as a main memory and a work area of the CPU 201. A keyboard controller (KBC) 205 controls entry from a keyboard (KB) 208 and a pointing device (not illustrated). A display controller (CRTC) 206 controls display onto a display unit (CRT) 209. A disc controller (DKC) 207 controls access to the HDD 210 storing boot programs, various applications, and font data. As used herein, the term "unit" generally refers to software, firmware, hardware, circuitry, or combinations thereof that is used to effectuate a purpose.

A network controller (NIC) 212 is connected to a network, and executes control processing of communication with another device connected to the network. A bus 204 connects the CPU 201, the RAM 202, the ROM 203, and various controllers, and conveys data signals and control signals.

In a case where the information processing apparatus (102, 104) is a mobile phone, a touch panel controller may be sometimes included in place of the KBC 205. In some cases, a large-capacity storage device is also included in place of the HDD 210. Furthermore, the NIC 212 has an internal configuration varying between a case where the information processing apparatus (102, 104) is connected to a wired local area network (LAN), a case where the information processing apparatus (102, 104) is connected to a wireless LAN, and a case where the information processing apparatus (102, 104) is connected to both of a wired LAN and a wireless LAN. Nevertheless, such a difference in internal configuration is hidden inside the NIC 212, and the information processing apparatus (102, 104) is enabled to control the system assuming that other modules illustrated in FIG. 2 are equivalent in any case.

Figure 3:
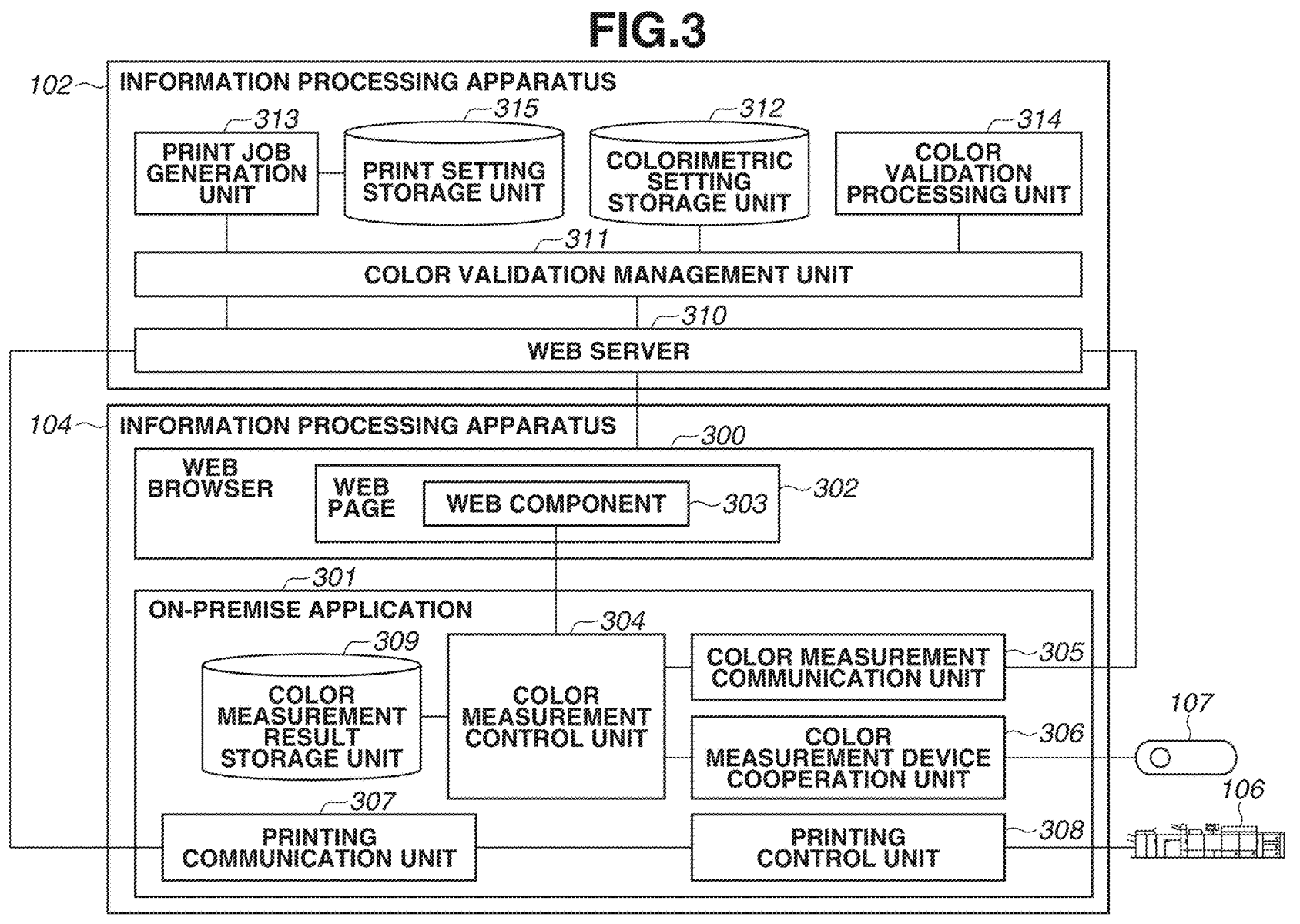

FIG. 3 is a functional block diagram illustrating functional blocks included in the web system 101 and the printing business operator system 103 included in the color validation system according to the present exemplary embodiment.

First of all, functional blocks included in the information processing apparatus 104 of the printing business operator system 103 will be described. A web browser 300 acquires content (screen information) by communicating with a web server 310. Then, the web browser 300 construes the acquired content and performs format and display (web page 302). The web browser 300 can also execute a programming language such as JavaScript.

An on-premise application 301 is an application having a role of a proxy that relays access between the web system 101, the image forming apparatus 106, the color measurement device 107, and the web browser 300. For example, when a chart is to be printed, the web system 101 prints a chart using the image forming apparatus 106 via the on-premise application 301.

In addition, when color measurement of the printed chart is performed, the color measurement device 107 is controlled via the on-premise application 301. When a chart is to be printed, the web system 101 may directly transmit print data of the chart and a print setting to the image forming apparatus 106 not via the on-premise application 301. Whether to use the on-premise application 301 is determined by a printing business operator depending on whether an image forming apparatus is to be connected to an external network. Any connection configuration may be employed in the present disclosure.

Figure 4A:
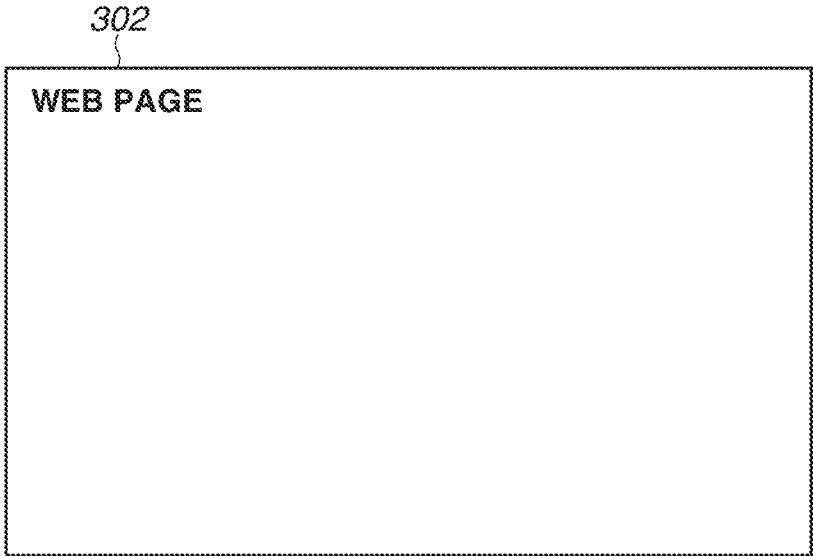
FIGS. 4A and 4B each illustrate an example of a web page according to the first exemplary embodiment.
Figure 4B:
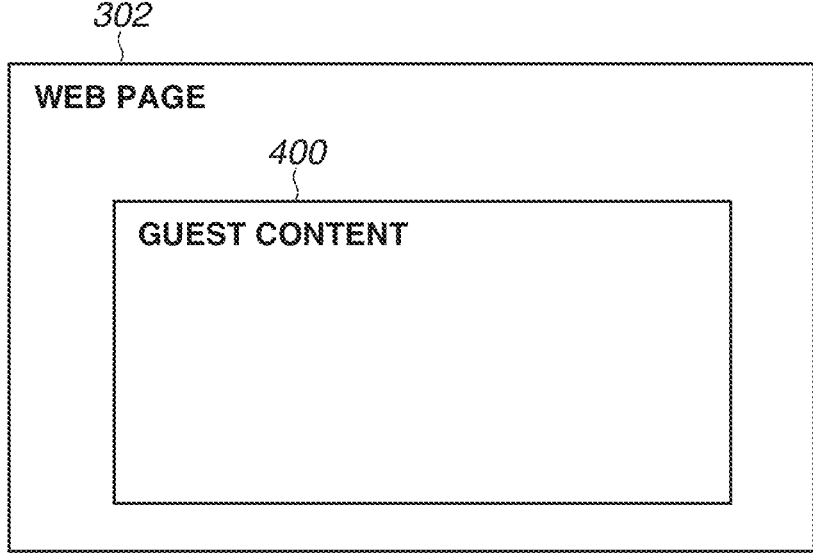

The web page 302 is content acquired by the web browser 300 from the web server 310, and is displayed on the web browser 300. While the web page 302 includes single piece of content as illustrated in FIG. 4A in some cases, guest content 400 is displayed in a nested structure as illustrated in FIG. 4B in other case.

A web component 303 is a program associated with the web page 302, and is executed on the web browser 300. In the present exemplary embodiment, JavaScript is assumed as the web component 303, but the web component 303 can be another program operating on the web browser 300. For example, the web component 303 may be an applet, Active X, or plug-in of the web browser 300.

If the web browser 300 displays the web page 302 (for example, a chart color measurement screen to be described below with reference to FIG. 6C), the web component 303 accesses the color measurement control unit 304 and establishes communication. After that, the web component 303 transmits an instruction to the color measurement control unit 304 in accordance with a user operation performed on the web page 302, and controls the color measurement device 107 in accordance with the user operation. The web component 303 also receives a response of the color measurement device 107 to the instruction from the color measurement control unit 304, and reflects the response in the web page 302.

In the present exemplary embodiment, WebSocket is used as a method of communication between the web component 303 and the color measurement control unit 304. Thus, the web component 303 and the color measurement control unit 304 can constantly maintain connection via a specific port. With this configuration, it is possible to convey the entry made by a user operation, to the color measurement device 107 in real time, and further reflect a response of the color measurement device 107 in the web page 302 in real time.

The color measurement control unit 304 receives an instruction from the web component 303, and controls the color measurement device 107 via a color measurement device cooperation unit 306. If the color measurement device 107 has read a patch, the color measurement control unit 304 transmits the reading result to the web component 303. If the reading of all patches included in the chart is completed, the color measurement control unit 304 stores the reading result into a color measurement result storage unit 309. Furthermore, if the color measurement control unit 304 receives a color measurement completion instruction from the web component 303, the color measurement control unit 304 acquires a color measurement result matching an identification (ID) included in the color measurement completion instruction, from the color measurement result storage unit 309, and transmits the acquired color measurement result to the web server 310 via a color measurement communication unit 305.

The color measurement communication unit 305 performs communication between the color measurement control unit 304 and the web server 310. If the color measurement communication unit 305 receives a color measurement result from the color measurement control unit 304, the color measurement communication unit 305 starts communication with the web server 310, and transmits the color measurement result to the web server 310. Although a communication method is not specified, a HyperText Transfer Protocol (HTTP) communication is used in the present exemplary embodiment. This is because there is no need to constantly connect the web server 310 and the on-premise application 301 in real time.

The color measurement device cooperation unit 306 is an interface to the color measurement device 107, and mediates communication between the color measurement control unit 304 and the color measurement device 107.

A printing communication unit 307 performs communication between a printing control unit 308 and the web server 310. When a printing instruction is issued by the user, the printing communication unit 307 receives a print job including a print setting and print data, from the web server 310, and further receives an internet protocol (IP) address of a transmission destination image forming apparatus, and delivers the IP address to the printing control unit 308.

If the printing control unit 308 receives a print job from the printing communication unit 307, the printing control unit 308 transmits the print job to the image forming apparatus 106 indicated by the IP address. In the present exemplary embodiment, HTTP communication is assumed as a transmission method of a print job. Nevertheless, another printing transmission method such as Hot Folder may be used because it is sufficient that a print job can be transmitted to the image forming apparatus 106.

The color measurement result storage unit 309 is a location into which the color measurement control unit 304 stores a color measurement result of a chart when the color measurement of the chart is completed. The color measurement result storage unit 309 may be stored into an HDD of the information processing apparatus 104 as a file, or may be tabular database as shown below, for example.

TABLE 1

| Color Measurement Result Storage Unit 309 | |
| --- | --- |
| Test ID | Measurement results |
| 000001 | 000001.cgat |
| 000002 | . . . |

The functional blocks included in the information processing apparatus 104 have been described above.

Next, functional blocks included in the information processing apparatus 102 of the web system 101 will be described. The web server 310 is a service program that performs HTTP communication with the web browser 300 and provides the display of a HyperText Markup Language (HTML) and an object (image, etc.) to the web browser 300. The web server 310 also performs HTTP communication with the printing communication unit 307, and transmits a print job to the on-premise application 301. Furthermore, the web server 310 performs HTTP communication with the color measurement communication unit 305, and receives a color measurement result of a chart from the color measurement control unit 304.

A color validation management unit 311 is a functional block for controlling each piece of processing of a color validation process.

Based on a user instruction entered on the web page 302, the color validation management unit 311 executes processing including printing of a chart, color measurement, up to color validation. The color validation management unit 311 also causes the web server 310 to perform transmission processing of a print job, and stores a color measurement result received by the web server 310 into the color measurement result storage unit 309.

A colorimetric setting storage unit 312 is a location into which a colorimetric setting entered by the user is stored. If the user enters a colorimetric setting and issues a save instruction on the web page 302 (setting screen in FIG. 5), the web component 303 delivers the colorimetric setting to the web server 310 via the web browser 300. FIG. 8 illustrates an example of a colorimetric setting 800 (to be described below). Then, the web server 310 delivers the colorimetric setting 800 to the color validation management unit 311. The color validation management unit 311 that has received the colorimetric setting 800 stores the received colorimetric setting 800 into the colorimetric setting storage unit 312.

The colorimetric setting 800 stored in the colorimetric setting storage unit 312 is used in a color validation system for various purposes. A conventional printing system is configured to prompt a user to enter a print setting, and upload print data to a web server. In the present disclosure, the user enters the colorimetric setting 800, and a print setting and print data are generated based on the colorimetric setting 800. Furthermore, the colorimetric setting 800 is also used as a determination reference of a color measurement result in color validation.

Furthermore, the colorimetric setting storage unit 312 stores a color measurement result transmitted from the on-premise application 301 in association with a colorimetric setting having the same identifier. FIG. 14 illustrates an example of a color measurement result (to be described below). Then, based on the identifier, the colorimetric setting storage unit 312 stores a color measurement result 1400 for a color validation processing unit 314, in association with the colorimetric setting 800.

For example, based on an identifier (Test ID) "000001", the colorimetric setting 800 and the color measurement result 1400 are associated as shown in Table 2 provided below.

TABLE 2

| Colorimetric setting Storage Unit 312 | | | |
| --- | --- | --- | --- |
| Test ID | Test settings | Measurement results | Validation result |
| 000001 | 000001.json | 000001.cgat | Passed |
| 000002 | 000002json | . . . | . . . |
| 000003 | 000003.json | 000003.cgat | Failed |

Figures 19A, 19B:
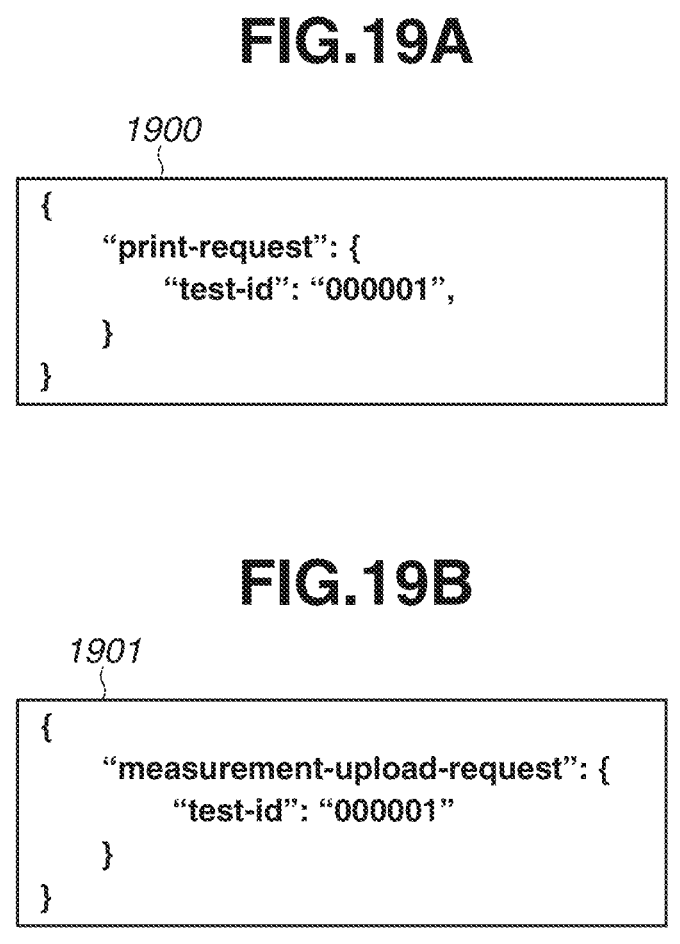

A print job generation unit 313 includes a function of generating a print setting and print data. Specifically, a printing instruction (press of a print button 504) is issued by the user on the web page 302 (setting screen in FIG. 5). If the printing instruction is issued, the web component 303 transmits the printing instruction to the web server 310 via the web browser 300. A printing instruction 1900 illustrated in FIG. 19A is an example of a printing instruction, and the printing instruction includes a command ("print-request") and an identifier ("test-id"). If the web server 310 delivers the printing instruction 1900 to the color validation management unit 311, the color validation management unit 311 acquires the colorimetric setting 800 from the color measurement result storage unit 309 based on the identifier (000001) designated in the printing instruction.

Figure 9A:
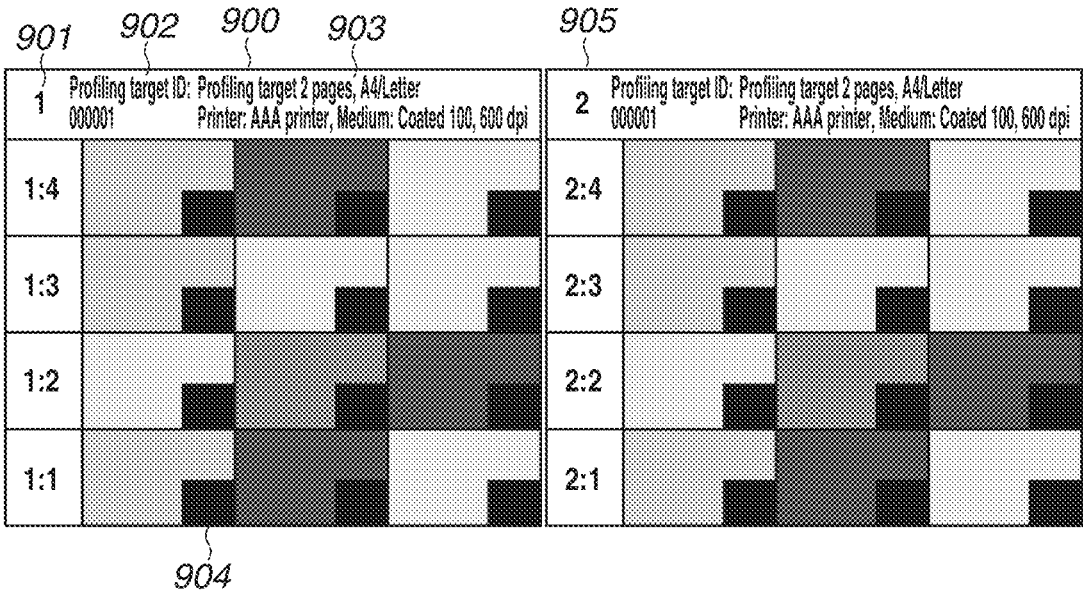
FIGS. 9A and 9B each illustrate an example of chart data according to the first exemplary embodiment.

The color validation management unit 311 delivers the acquired colorimetric setting 800 to the print job generation unit 313. The print job generation unit 313 generate a print job including a print setting of a chart and print data that satisfies the colorimetric setting 800. Print data of charts 900 and 905 illustrated in FIG. 9A are examples of print data, and a print setting 1000 illustrated in FIG. 10 is an example of a print setting.

In the generation of the print setting 1000, for example, as shown in Table 3 provided below, the print setting storage unit 315 preliminarily associates a color reference and a print parameter. Based on a color reference (FOGRA xxxx-yyyy) of the colorimetric setting 800, the print job generation unit 313 acquires related print parameters from the print setting storage unit 315, and generates the print setting 1000.

TABLE 3

| Print Setting Storage Unit 315 | | | | | |
| --- | --- | --- | --- | --- | --- |
| Test specification | Media Dimension | Side | Orien-tation | OutputBin | Weight |
| FOGRA xxxx-yyyy | 210 297 | One sided | Rotate0 | AutoSelect | 100 |
| GRACOL bbbb-cccc | 210 297 | Two sided | Rotate90 | Autoselect | 80 |
| Japan Color ffff-ggg | 210 297 | One sided | Rotate180 | Autoselect | 90 |

Then, the print job generation unit 313 returns the generated print job to the color validation management unit 311. After that, the color validation management unit 311 transmits the print job to the on-premise application 301 via the web server 310.

The color validation processing unit 314 performs pass or failure determination with respect to a designated color reference, by comparing a color measurement result obtained by reading a printed chart, with a color reference of a printing industry or a color reference uniquely defined by a printing firm.

Specifically, when a color measurement completion button is pressed by the user on the web page 302, the web component 303 transmits a color measurement result transmission instruction to the color measurement control unit

304 to transmit the color measurement result 1400. FIG. 19B illustrates an example of the color measurement result transmission instruction, and the instruction includes a command "measurement-upload-request" and an identifier "test-id". The color measurement control unit 304 that has received the instruction acquires the color measurement result 1400 stored in the color measurement result storage unit 309, based on an identifier (000001) included in the instruction, and transmits the color measurement result 1400 to the web server 310 via the color measurement communication unit 305. After the color validation management unit 311 stores the color measurement result 1400 into the colorimetric setting storage unit 312, the color validation management unit 311 acquires the colorimetric setting 800 related to the color measurement result 1400, from the colorimetric setting storage unit 312, and delivers the colorimetric setting 800 to the color validation processing unit 314. The color validation processing unit 314 executes color validation based on the colorimetric setting 800 and the color measurement result 1400, and returns the obtained determination result to the color validation management unit 311. Then, the color validation management unit 311 stores the determination result into the colorimetric setting storage unit 312.

FIG. 5 illustrates an example of a setting screen of the web page 302 to be displayed on the web browser 300. The setting screen illustrated in FIG. 5 is a screen for making a setting to be used in three steps including printing, color measurement, and color validation.

In a colorimetric setting list 505, created colorimetric settings are displayed. In the present exemplary embodiment, a color reference to be used in color validation, a color validation target image forming apparatus, a chart print condition, and an identifier are displayed in the colorimetric setting list 505. A colorimetric setting add button 500 is a button for adding a new colorimetric setting to the colorimetric setting list 505. If the colorimetric setting add button 500 is pressed, a colorimetric setting edit area 506 is displayed, and the user can enter information. For example, the user can designate items for each colorimetric setting. Specifically, the colorimetric setting edit area 506 includes a color reference selection portion 507, an image forming apparatus selection portion 508, a sheet type selection portion 510, a sheet grammage selection portion 511, a resolution selection portion 512, an M factor selection portion 513, an observation light source selection portion 514, a view angle selection portion 515, and a color measurement mode selection portion 516.

A colorimetric setting edit button 501 is a button for editing one colorimetric setting selected in the colorimetric setting list 505. If the colorimetric setting edit button 501 is pressed, the colorimetric setting edit area 506 is displayed, and the user can enter information.

A colorimetric setting deletion button 502 is a button for deleting a colorimetric setting selected in the colorimetric setting list 505. If the colorimetric setting deletion button 502 is pressed, the web browser 300 transmits a deletion request of a colorimetric setting to the web server 310, and the web server 310 delivers the deletion request to the color validation management unit 311. Then, the color validation management unit 311 deletes the designated colorimetric setting from the colorimetric setting storage unit 312.

A print data download button 503 is a button for downloading print data of a chart to a designated local folder. For example, in a case where color validation of an image forming apparatus not supported by the color validation system is desired to be performed, the color validation system cannot perform printing using the image forming apparatus in some cases. Thus, by once downloading print data of a chart to a local folder, the print data can be printed using a printer driver.

A print button 504 is a button for directly printing a chart using the image forming apparatus 106 from the web system 101. For example, if the print button 504 is pressed, the web browser 300 transmits the printing instruction 1900 (illustrated in FIG. 19A) of the colorimetric setting 800 to the web server 310, and the web server 310 delivers the printing instruction 1900 to the color validation management unit 311. If the web server 310 delivers the printing instruction 1900 to the color validation management unit 311, the color validation management unit 311 acquires the colorimetric setting 800 based on an identifier 807 (000001) designated in the printing instruction 1900, from the colorimetric setting storage unit 312. The color validation management unit 311 delivers the acquired colorimetric setting 800 to the print job generation unit 313. The print job generation unit 313 generates a print job including the print setting 1000 of charts and the print data of the charts 900 and 905 that satisfies the colorimetric setting 800. Then, the print job generation unit 313 returns the generated print job to the color validation management unit 311. After that, the color validation management unit 311 transmits the print job and an IP address of the image forming apparatus 106 to the on-premise application 301 via the web server 310. The on-premise application 301 transmits the print job to the image forming apparatus 106.

A colorimetric setting save button 517 is a button for storing a colorimetric setting edited in the colorimetric setting edit area 506. If the colorimetric setting save button 517 is pressed, the color validation management unit 311 allocates an identifier (e.g., 000001) to a colorimetric setting, and stores the colorimetric setting into the colorimetric setting storage unit 312 in a JavaScript Object Notation (JSON) format (e.g., the colorimetric setting 800 in FIG. 8) generally used in a web system.

The color reference selection portion 507 is a selection portion for selecting a standard printing color reference or a user-defined printing color reference. The standard printing color reference refers to a standard defined by an international standardization organization such as the International Organization for Standardization (ISO). For example, a color reference such as GRACOL of the United States, FOGRA of Europe, or Japan Color of Japan exists for each region. In addition, a user-defined printing color reference refers to a color reference uniquely defined by a printing firm. For example, a user-defined printing color reference is used in a case where a printing firm desires to perform an operation of colors more strictly than a standard printing color reference. A user-defined printing color reference may be created by a tool provided by the web system 101, or may be created by another tool and imported into the web system 101. An imported user-defined printing color reference is displayed in the color reference selection portion 507. The detailed description of the creation of a user-defined printing color reference will be omitted.

Conventionally, the quality of printed materials has been determined based on the appearance, and printed materials have been created in the absence of clear standards. For this reason, a printing firm has often responded to requests for color reproduction from an orderer or a designer, by performing revision and reprinting a number of times. By providing a standard color reference for the creation of printed materials, such a situation can be improved.

A color reference selected in the color reference selection portion 507 is used in printing and generation of print data of a chart. For example, the number of patches is defined as ISO12642-2 (1617-color patches) in the case of Japan Color 2011, and print data of a chart is generated in such a manner as to satisfy the number of patches. The printed chart is subjected to color measurement using the color measurement device 107, and a color measurement result is generated. Then, a color reference selected in the color reference selection portion 507 is used at the time of color validation as a comparison target to be compared with the color measurement result. As a result of the comparison, a determination result indicating that the color measurement result is "pass" or "failed" with respect to the color reference can be obtained.

The image forming apparatus selection portion 508 is a selection portion for selecting an image forming apparatus to be used for outputting print data of the chart. By obtaining a color measurement result by performing color measurement of a chart output from an image forming apparatus selected in the image forming apparatus selection portion 508, a current color status of the image forming apparatus can be recognized. At the time of color validation, a color measurement result of a chart output from the image forming apparatus and a color reference selected in the color reference selection portion 507 are compared. A color state of the image forming apparatus selected in the image forming apparatus selection portion 508 can be thereby validated with respect to the color reference.

The sheet type selection portion 510 is a selection portion for selecting a sheet type to be used when print data of the chart is printed. At the time of printing, the chart is printed on an image forming apparatus using the designated sheet type. At the time of color measurement, a sheet type serves as one of print conditions affecting a color measurement result. For example, because hue (LAB value) of a chart varies depending on whether a sheet type is coated paper or uncoated paper, a system needs to store a print condition under which the chart has been printed. Then, when a color validation result is displayed, the user is notified that a color validation result is pass or failed in a case where a chart printed under a designated print condition as illustrated in a Test Condition in a color validation result list 700 in FIG. 7A is subjected to color measurement. With this configuration, when printing is performed using an image forming apparatus that has passed color validation, if a print condition similar to the print condition used in the color validation is used, the user can obtain a printed material complying with a color reference.

The sheet grammage selection portion 511 is a selection portion for selecting a grammage of a sheet to be used when print data of the chart is printed using an image forming apparatus. Because hue of a printed chart varies between a case where a sheet grammage is large and a case where a sheet grammage is small, a sheet grammage also serves as one of print conditions. Because the print conditions are similar to those of the sheet type, the description will be omitted.

The resolution selection portion 512 is a selection portion for selecting resolution to be used when print data of the chart is printed using an image forming apparatus. Because an image printed at insufficient resolution gives the impression that the image is roughly blurred, resolution designated when the chart is printed also serves as one of print conditions similarly to the sheet type and the sheet grammage. Because the print conditions are similar to those of the sheet type, the description will be omitted.

The M factor selection portion 513 is a selection portion for selecting the intensity of ultraviolet in the color measurement device 107. The "M" of an M factor indicates a standard for illumination in a measurement device that is formulated by the ISO13655 2009. In recent years, more and more sheets containing fluorescent brightener tend to be used. On such sheets, color hue varies depending on the intensity of ultraviolet components of a light source that illuminates a sample. Thus, the ISO has defined the intensity of ultraviolet in a measurement device as follows.

M0: an illumination having a spectral distribution of a tungsten lamp

M1: an illumination having UV power of D50

M2: an illumination that emits light from which ultraviolet (UV) region energy is cut by a UV filter M3: an illumination that emits light from which UV region energy is cut by a polarization filter An M factor selected in the M factor selection portion 513 is not used in printing. On the other hand, by conveying an M factor to the color measurement device 107 at the time of color measurement, the intensity of ultraviolet in the color measurement device 107 is controlled. At the time of color validation, an M factor used in the color measurement from which a color measurement result has been obtained can also be conveyed using a color validation result (not illustrated).

The observation light source selection portion 514 is a selection portion for selecting an observation light source to be used in color measurement. An observation light source is conveyed to the color measurement device 107 at the time of color measurement, and is to be used for controlling the color measurement device 107, and is not used in printing. An observation light source used in the color measurement can also be conveyed using a color validation result (not illustrated).

An observation light source is also referred to as an illuminant. The illuminant is a mathematical representation of a virtual light source, and is to be used for the calculation of tristimulus values from spectrometry in the color measurement device 107. In the color validation in the commercial printing field, D50 is generally used.

The view angle selection portion 515 is a selection portion for selecting a view angle to be used in color measurement. The view angle is conveyed to the color measurement device 107 at the time of color measurement, and is to be used for controlling a sensor of the color measurement device 107, and is not used in printing. A view angle used in the color measurement can also be conveyed using a color validation result (not illustrated). Generally, in a case where a color is to be evaluated using a field of view at 4° or less, a field of view at 2° is used, and in a case where a color is to be evaluated using a field of view at 4° or more, a field of view at 10° is used. Because a uniform color region is relatively small in the case of the commercial printing field, the field of view at 2° is generally used. On the other hand, in a case where a uniform color is used in a large region such as a body color of a vehicle (automotive paint), the field of view at 10° is used.

The color measurement mode selection portion 516 is a selection portion for selecting a color measurement mode to be used in color measurement, between single scan for performing color measurement of a printed chart only once using the color measurement device 107 and dual scan for performing color measurement twice.

FIGS. 6A, 6B, 6C, and 6D each illustrate an example of a color measurement execution screen of the web page 302 to be displayed on the web browser 300.

FIG. 6A illustrates an example of a colorimetric setting selection screen. A color measurement step display region 600 visually displays a currently ongoing work among four steps of color measurement works. Because FIG. 6A illustrates a screen for a selection work of a colorimetric setting, step 1 is displayed in a highlighted manner.

An identifier entry box 601 is a box for entering an identifier of a colorimetric setting. If an identifier of a colorimetric setting is entered by the user and an OK button 604 is pressed, a colorimetric setting matching the identifier can be brought into a selectable state in a colorimetric setting list 602.

A color measurement start button 603 is a button for starting a color measurement work with a colorimetric setting selected in the colorimetric setting list 602. If the color measurement start button 603 is pressed, the web browser 300 transmits a color measurement start instruction for the selected colorimetric setting to the web server 310, and the web server 310 delivers the color measurement start instruction to the color validation management unit 311. The color validation management unit 311 acquires a colorimetric setting from the colorimetric setting storage unit 312 based on an identifier designated in a printing instruction. Based on a colorimetric setting, the color validation management unit 311 creates a chart color measurement request to be described below with reference to FIG. 12, and delivers the chart color measurement request to the web server 310. When the web server 310 transmits a color measurement device preparation screen illustrated in FIG. 6B, to the web browser 300, the web server 310 also transmits the chart color measurement request together.

FIG. 6B illustrates an example of a color measurement device preparation screen (color measurement device selection screen).

A color measurement device preparation operation preview 613 has a role of conveying an image of a preparation operation of the color measurement device 107 in an easy-to-understand manner. In the present exemplary embodiment, a stationary image is displayed.

A color measurement device selection portion 605 is a selection portion for prompting a user to select one color measurement device from among a list of color measurement devices connected to the information processing apparatus 104.

Color measurement device preparation operation information 606 displays a preparation operation for a color measurement device selected in the color measurement device selection portion 605. In a case where a preparation operation varies depending on the color measurement device, a text displayed in the color measurement device preparation operation information 606 is changed.

A color measurement cancel button 607 is a button for cancelling a currently ongoing color measurement work. If the color measurement cancel button 607 is pressed, the color measurement work is cancelled, and the color measurement device selection screen returns to the colorimetric setting selection screen illustrated in FIG. 6A. A previous button 608 is a button for returning the screen to a previous screen displayed immediately before the currently-displayed screen. A next button 609 is a button for shifting the screen to a subsequent screen to be displayed immediately after the currently-displayed screen.

Figure 6C:
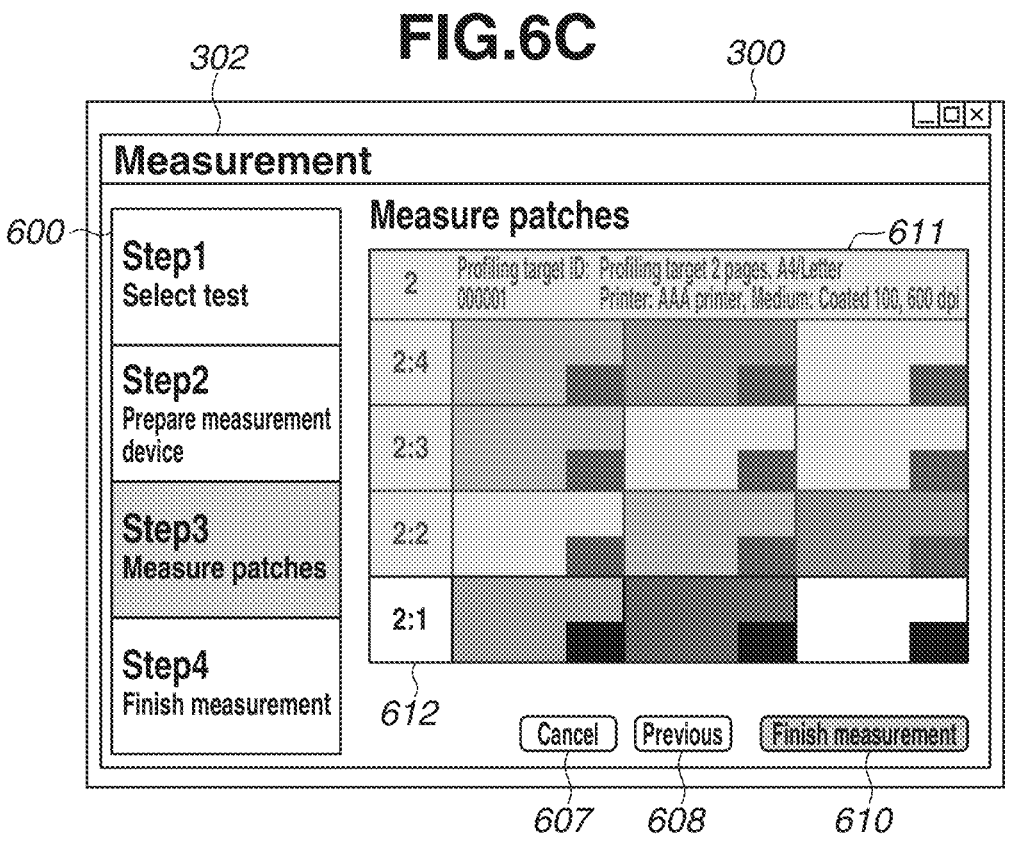
Figure 6D:
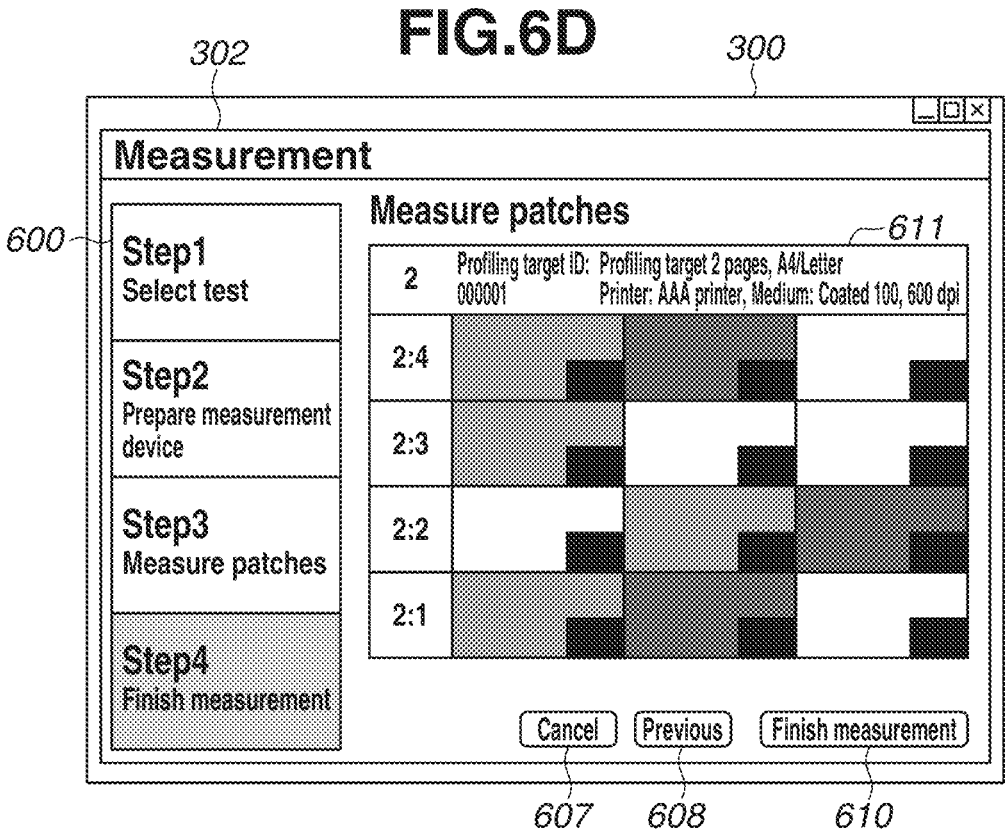

FIG. 6C illustrates an example of a chart color measurement screen. A color measurement completion button 610 is a button for completing a color measurement work. As illustrated in FIG. 6D, this button is enabled when color measurement of all patches of a chart ends. If the color measurement completion button 610 is pressed after the color measurement completion button 610 is enabled, color measurement of the chart is completed. Then, the web component 303 instructs the color measurement control unit 304 to transmit a color measurement result.

A chart preview 611 displays a preview of a chart that is based on the colorimetric setting selected on the screen illustrated in FIG. 6A. In the chart preview 611, patches 612 on which color measurement is to be performed by the user are displayed in a highlighted manner. The chart preview 611 in FIG. 6C is an example in which a preview of a chart is displayed based on a patch layout 803 in the colorimetric setting 800. The patch layout 803 in the colorimetric setting 800 includes two pages (pages 804 and 805), and each page includes 4×3 patches. Thus, a preview of a chart including 4×3 patches is displayed in the chart preview 611.

Figure 7B:
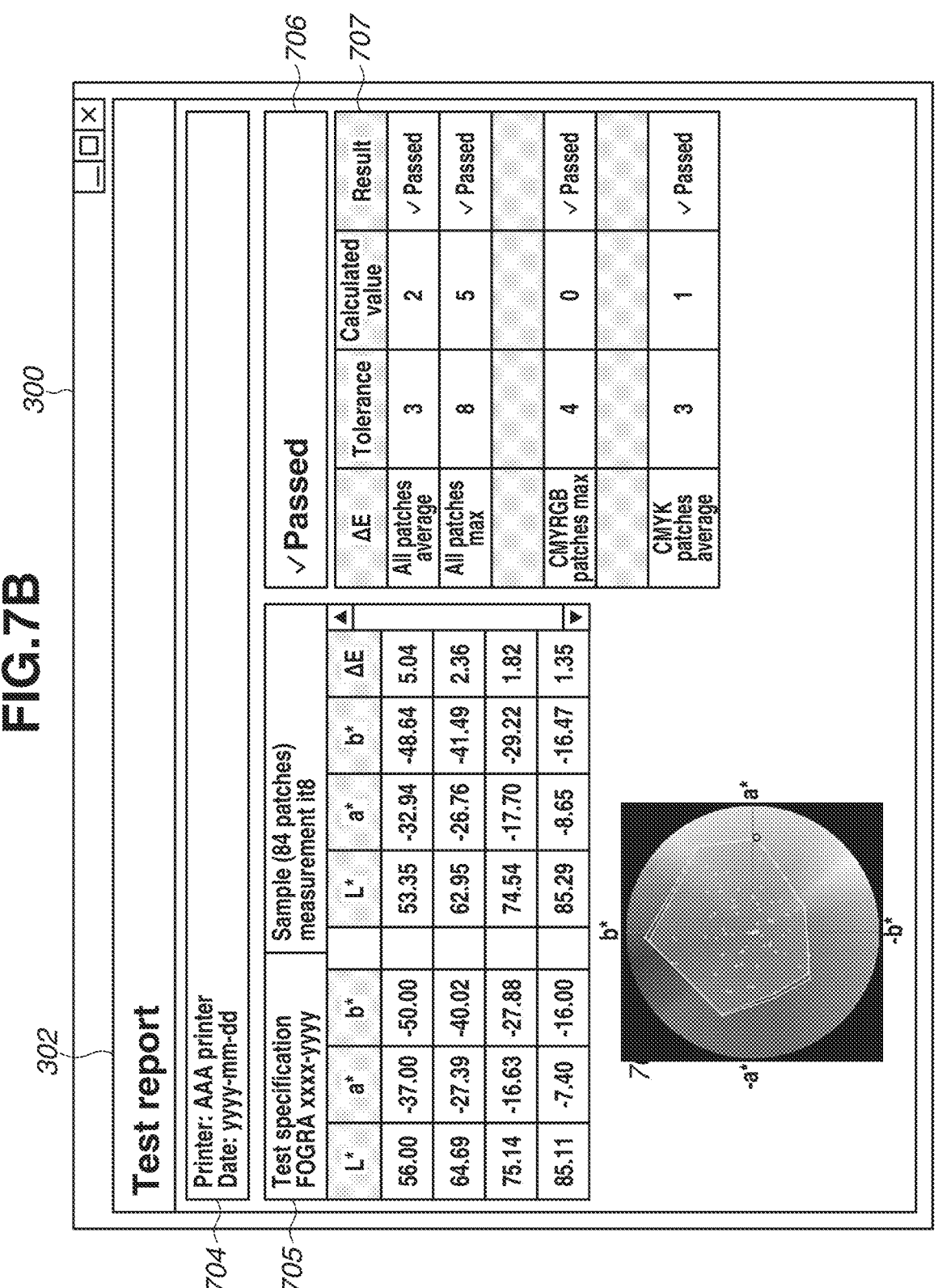

FIGS. 7A and 7B each illustrate an example of a color validation result display screen to be displayed after completion of color measurement.

FIG. 7A illustrates an example of a color validation result list screen. The color validation result list 700 is a list for displaying results of executed color validation. A color validation result (Pass or Failed) is displayed on a Result column. A color validation result display button 701 is a button for displaying a color validation report to be described below with reference to FIG. 7B.

A color validation result download button 702 is a button for downloading a color validation report onto a local folder. A color validation result deletion button 703 is a button for deleting a color validation result selected in the color validation result list 700.

FIG. 7B illustrates an example of a color validation report describing the details of a color validation result.

A region 704 is a region displaying an image forming apparatus used in color validation and date on which the color validation has been executed. A region 705 is a region in which information regarding a color reference designated by the user in a colorimetric setting and a value of a color measurement result are compared, and specific LAB values are displayed. A region 706 displays a pass or failure determination result of a color validation result.

A region 707 displays a pass or failure determination result for each check item of color validation. A region 708 graphically displays a color difference between a color reference selected by the user and a color measurement result obtained by performing color measurement of a chart.

The configuration of the color validation system according to the present exemplary embodiment has been described above. With this configuration, three steps (printing of a chart, color measurement of the chart, and color validation) of a color validation process are implemented.

Hereinafter, printing of a chart will be described using a specific example.

The colorimetric setting 800 illustrated in FIG. 8 illustrates an example of a colorimetric setting. The colorimetric setting 800 is generated by the color validation management unit 311 based on values entered by the user on the setting screen in FIG. 5, and is stored in the colorimetric setting storage unit 312. The identifier 807 (000001) in the colorimetric setting 800 is automatically set if the save button 517 is pressed by the user on the setting screen in FIG. 5.

A color reference 801 is a color reference designated by the user in the color reference selection portion 507 in FIG. 5.

A patch size 802 indicates a dimension in which patches in a chart are to be printed in the color reference 801 designated by the user.

The patch layout 803 is defined in the color reference 801 designated by the user, and determines the layout of patches in the chart. The patch layout 803 in the present exemplary embodiment is an array, and includes brackets for each page, each row, and each column. One column indicates one patch, and cyan, magenta, yellow, black (CMYK) signal values are described in one example.

In the present exemplary embodiment, the patch layout 803 includes two pages corresponding to the pages 804 and 805. The pages 804 and 805 each include four rows longitudinally. Each row include three columns. In other words, a chart includes two pages, and each page include 4×3 patches. Using values in the patch layout 803, the color validation management unit 311 generates the chart preview 611 illustrated in FIG. 6C (chart including two pages each including 4 rows×3 columns of patches).

A color measurement mode 806 indicates a color measurement mode in the colorimetric setting 800. For example, the color measurement mode 806 includes an illumination condition, a color measurement direction, and a scan mode meaning the number of times color measurement of the patch is to be performed. There are two scan modes. One scan mode is "single scan" for performing color measurement of the patch only once, and another scan mode is "dual scan" for performing color measurement of the patch twice. The color measurement mode 806 indicates a value selected by the user in the color measurement mode selection portion 516 in FIG. 5.

FIG. 9A illustrates an example of print data of a chart according to the present exemplary embodiment.

Print data of a chart includes two pages. The pages 804 and 805 defined in the colorimetric setting 800 in FIG. 8 respectively correspond the charts 900 and 905. The chart 900 is broadly divided into four blocks. A number of pages 901 indicates the number of pages of the print data of the chart 900. Because the print data includes two pages in the print data example of the present exemplary embodiment, a number "2" is allocated.

An identifier 902 is an identifier automatically issued when the user creates a colorimetric setting on the setting screen in FIG. 5. The identifier 902 is provided to facilitate the association between a printed chart and a colorimetric setting on a screen. When a chart printing instruction is issued, an identifier of a colorimetric setting selected by the user is allocated to the print data as the identifier 902.

A print condition 903 is a print condition entered by the user when the user creates a colorimetric setting on the setting screen in FIG. 5. When a chart printing instruction is issued, a print condition of a colorimetric setting selected by the user is allocated as the print condition 903.

Chart information 904 is a chart itself on which the user conducts color measurement. The same chart is represented in the chart information 904 and the chart preview 611 displayed on the web page 302.

Figure 20:
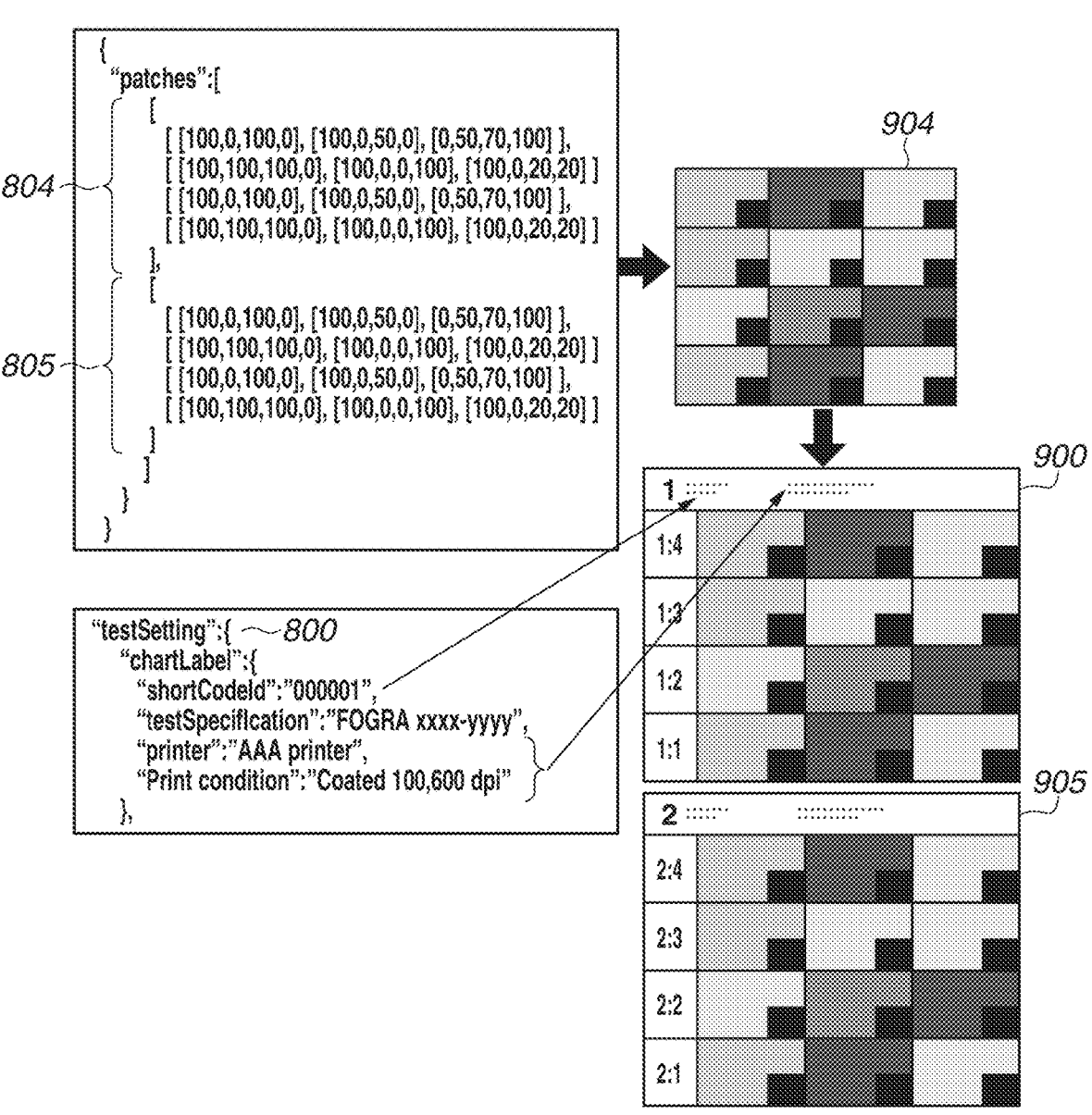
FIG. 20 is a schematic diagram of a patch layout according to the first exemplary embodiment.

When the chart information 904 and the number of pages 901 are determined, the following processing is performed. First, based on a color reference selected by the user, a sheet size is determined from the print setting storage unit 315. Next, based on color information defined in a patch layout specification and a color reference readable by a color measurement device, the patch size 802 and the patch layout 803 are determined in such a manner as to fit a sheet size. Based on the color information, the patch size 802, and the patch layout 803 defined in the color reference, the chart information 904 is created. Specifically, FIG. 20 illustrates a relationship between the colorimetric setting 800 and the charts 900 and 905. First, based on 4×3 rows and columns and CMYK signal value on the page 804 of the colorimetric setting 800, the chart information 904 is generated. Next, information such as the identifier 902 (00001) of the colorimetric setting 800, a test specification, and an image forming apparatus is added to the print condition 903, and the chart 900 is generated. By similar processing, the chart 905 is generated based on the page 805.

Figure 9B:
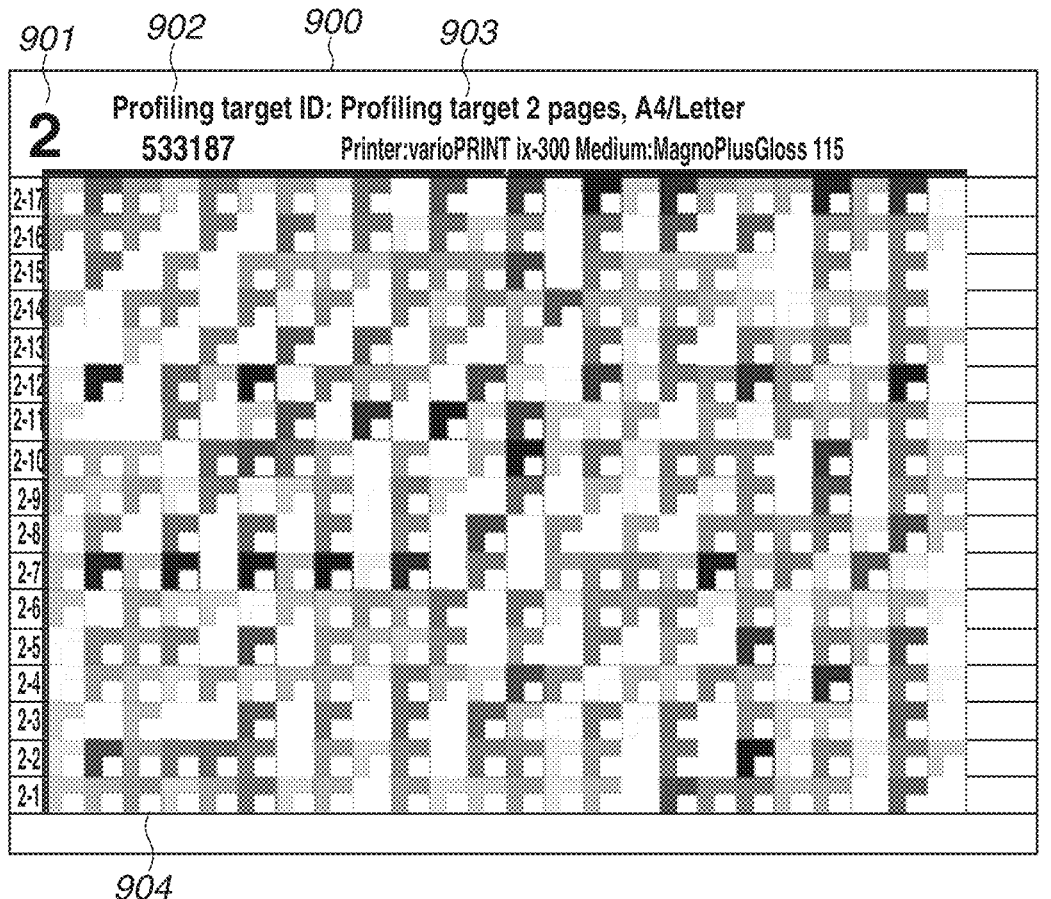

For the sake of explanatory convenience, the description in the present exemplary embodiment will be given using an example of 4 rows×3 columns patches illustrated in FIG. 9A. Actually, a patch size is smaller and the number of patches is larger in many cases as illustrated in FIG. 9B.

FIG. 10 illustrates an example of a print setting according to the present exemplary embodiment. In the present exemplary embodiment, the description will be given using a job definition format (JDF) standard in the printing industry.

A number of pages 1001 indicates the number of pages of print data designated in 1002. For example, because the number of pages of the print data of the chart 900 in FIG. 9A is two, "2" is set in the number of pages 1001.

Print parameters 1003, 1004, 1005 are generated based on values stored in the print setting storage unit 315 in Table 3 in association with a color reference. Specifically, the print job generation unit 313 acquires information regarding the color reference 801, from the colorimetric setting 800 delivered from the color validation management unit 311. Based on the color reference 801, the print job generation unit 313 identifies a test specification from a "Test Specification" column in the print setting storage unit 315. For example, in the case of a test specification of the colorimetric setting 800, a column of "FOGRA xxxx-yyyy" is identified in the print setting storage unit 315. Then, the print job generation unit 313 acquires print parameters from the identified test specification column. For example, the print parameter 1003 is "Rotate0" on an Orientation column in the print setting storage unit 315, and the print parameter 1004 is "AutoSelect" on an OutputBin column in the print setting storage unit 315. In this manner, parameters in the JDF are generated based on print parameters in the print setting storage unit 315.

FIGS. 11A, 11B, and 11C are flowcharts each illustrating a flow of processing of chart printing. The following processing is executed by the CPU 201 of the information processing apparatus 104.

FIG. 11A is a main flowchart of chart printing.

In step S1100, the color validation management unit 311 receives a colorimetric setting entered by the user, from the web component 303 (setting screen in FIG. 5), and generates the colorimetric setting 800. In step S1101, the color validation management unit 311 stores the colorimetric setting 800 into the colorimetric setting storage unit 312. In step S1102, the color validation management unit 311 determines whether the printing instruction 1900 has been received from the web component 303. In a case where the printing instruction 1900 has been received (YES in step S1102), the color validation management unit 311 advances the processing to step S1103. In a case where the printing instruction 1900 has not been received (NO in step S1102), the color validation management unit 311 ends the processing.

In step S1103, the color validation management unit 311 acquires the colorimetric setting 800 stored in the colorimetric setting storage unit 312 based on an identifier (000001) included in the printing instruction 1900. Then, the color validation management unit 311 delivers the colorimetric setting 800 to the print job generation unit 313, and hands over print data generation processing and print setting generation processing.

In step S1104, the print job generation unit 313 performs processing to be described below with reference to FIG. 11B, generates print data (the charts 900 and 905 in FIG. 9A), and returns the print data to the color validation management unit 311.

In step S1105, the print job generation unit 313 performs processing to be described below with reference to FIG. 11C, generates the print setting 1000, and returns the print setting 1000 to the color validation management unit 311.

In step S1106, the color validation management unit 311 transmits a print job including print data and the print setting 1000, to the printing communication unit 307 of the on-premise application 301 via the web server 310. Then, the color validation management unit 311 starts printing using the image forming apparatus 106 ("AAA printer" in FIG. 8) having an IP address designated in the colorimetric setting 800. The printing communication unit 307 delivers the print job to the printing control unit 308, and the printing control unit 308 transmits the print job to the image forming apparatus 106 having the designated IP address.

FIG. 11B is a flowchart illustrating a flow of generating print data.

In step S1107, the print job generation unit 313 acquires information regarding the patch layout 803, from the colorimetric setting 800 delivered from the color validation management unit 311.

In step S1108, the print job generation unit 313 generates chart information (chart information 904 in FIG. 9) based on the patch layout 803. Specifically, in the present exemplary embodiment, the patch layout 803 includes two pages corresponding to the pages 804 and 805. The pages 804 and 805 each include four rows longitudinally. Each row include three columns. In other words, a chart includes two pages, and each page include 4×3 patches. Using values in the patch layout 803, the print job generation unit 313 generates the chart information 904 regarding a chart including two pages each including 4 rows×3 columns of patches.

In step S1109, the print job generation unit 313 determines the number of pages based on the print data acquired in step S1108.

In step S1110, the print job generation unit 313 generates print data based on information determined in steps S1108 to S1109. Specifically, the print job generation unit 313 generates print data by allocating an identifier (the identifier 902 in FIG. 9) and a print condition (print condition 903 in FIG. 9) to print data based on the colorimetric setting, and allocating the number of pages (the number of pages 901 in FIG. 9) and chart information (chart information 904 in FIG. 9) to print data.

FIG. 11C is a flowchart illustrating a flow of generating a print setting.

In step S1111, the print job generation unit 313 acquires the color reference 801 (FOGRA xxxx-yyyy) from the colorimetric setting 800.

In step S1112, the print job generation unit 313 searches the print setting storage unit 315 for the color reference 801 and acquires related print parameters. Specifically, the print job generation unit 313 identifies a test specification from the "Test Specification" column in the print setting storage unit 315 based on the color reference 801 (FOGRA xxxx-yyyy). For example, in the case of a test specification of the colorimetric setting 800, a column of "FOGRA xxxx-yyyy" is identified in the print setting storage unit 315. Then, the print job generation unit 313 acquires print parameters from the identified test specification column.

In step S1113, the print job generation unit 313 generates the print setting 1000 as described with reference to FIG. 10, based on the print parameters. For example, the print parameter 1003 is "Rotate0" on the Orientation column in the print setting storage unit 315, and the parameter 1004 is "AutoSelect" on the OutputBin column in the print setting storage unit 315. In this manner, parameters in the JDF are generated based on print parameters in the print setting storage unit 315.

An example of chart printing according to the present exemplary embodiment has been described above. As described using a specific example, in the chart printing according to the present exemplary embodiment, the user performs a colorimetric setting on the web browser 300 instead of a print setting. Then, a color validation system automatically generates print data and a print setting based on the colorimetric setting. The colorimetric setting is also used in chart preview display as illustrated in FIGS. 6C and 6D, and is also used in color validation as illustrated in FIGS. 7A and 7B.

Hereinafter, color measurement processing of a printed chart will be described using a specific example.

FIG. 12 illustrates an example of a chart color measurement request. When a color measurement start instruction is received from the web browser 300 by the color measurement start button 603 being pressed, a chart color measurement request 1200 is generated based on the colorimetric setting 800. The chart color measurement request 1200 is transmitted by the web server 310 together with the web page 302 of the color measurement device preparation screen illustrated in FIG. 6B. In the present exemplary embodiment, a JSON format generally used in a web system is used as a data format of the chart color measurement request.

Because the chart color measurement request 1200 is generated based on the colorimetric setting 800, colorimetric settings 801 to 807 are the same as those in the colorimetric setting 800. On the other hand, in the chart color measurement request 1200, authentication information 1201 is added to the colorimetric setting 800. The authentication information 1201 is generated when the user logs into a color validation system. In flowcharts to be described below, the colorimetric settings (801 to 807) included in the chart color measurement request 1200 are used in processing such as determination of color measurement completion that is performed by the color measurement control unit 304. The authentication information 1201 is also used in user authentication executed when the color measurement control unit 304 uploads a color measurement result 1400 onto the web server 310.

Figures 13A, 13B, 13C:
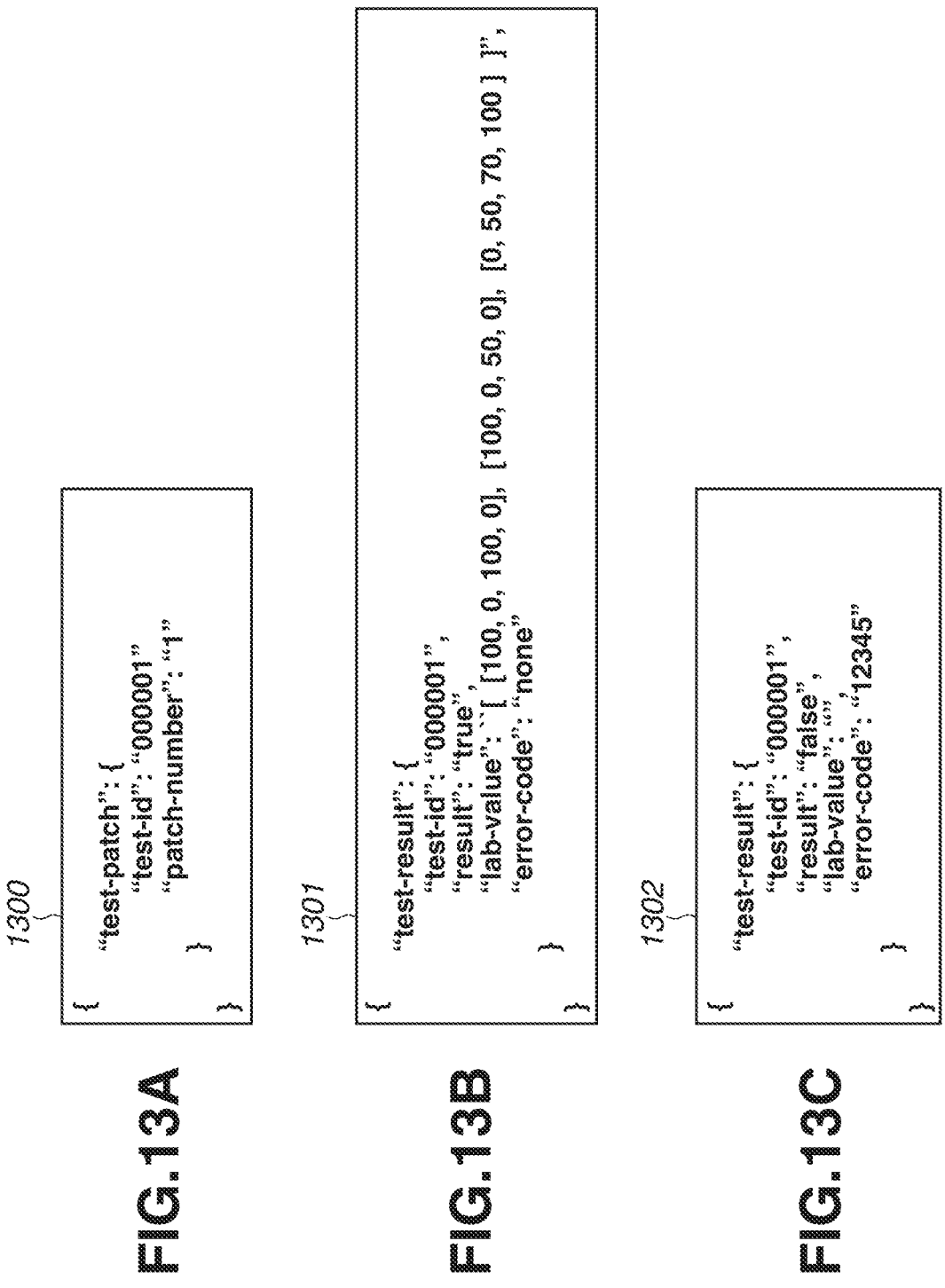
FIGS. 13A, 13B, and 13C illustrate an example of a patch color measurement request and a patch color measurement result according to the first exemplary embodiment.

FIGS. 13A, 13B, and 13C illustrate an example of a patch color measurement request and a patch color measurement result that are communicated between the web component 303 and the color measurement control unit 304.

A patch color measurement request 1300 illustrated in FIG. 13A includes an identifier of a colorimetric setting and a patch row number of a color measurement target. In the present exemplary embodiment, an example in which color validation is performed with respect to the colorimetric setting 800 will be described. Thus, an identifier of the patch color measurement request 1300 includes the same value (000001) as the identifier 807 of the colorimetric setting 800. A patch row number of a color measurement target indicates a row selected by the user in the chart preview 611 displayed on the chart color measurement screen in FIG. 6C.

Patch color measurement results 1301 and 1302 in FIGS. 13B and 13C include an identifier of a colorimetric setting, a color measurement result, values obtained by color measurement, and an error code of an error that has occurred in the color measurement device 107. The color measurement result means a color measurement processing result in the color measurement device 107. The patch color measurement result 1301 in FIG. 13B indicates a color measurement result of the first row designated in the patch color measurement request 1300.

FIG. 14 illustrates an example of a color measurement result generated when chart color measurement has been fully completed. In the present exemplary embodiment, the color measurement result 1400 is represented in a CGAT format, which is an international standard, and includes metadata for identifying colorimetric values in the color measurement device 107 and the color measurement result 1400 using programs.

Figure 15:
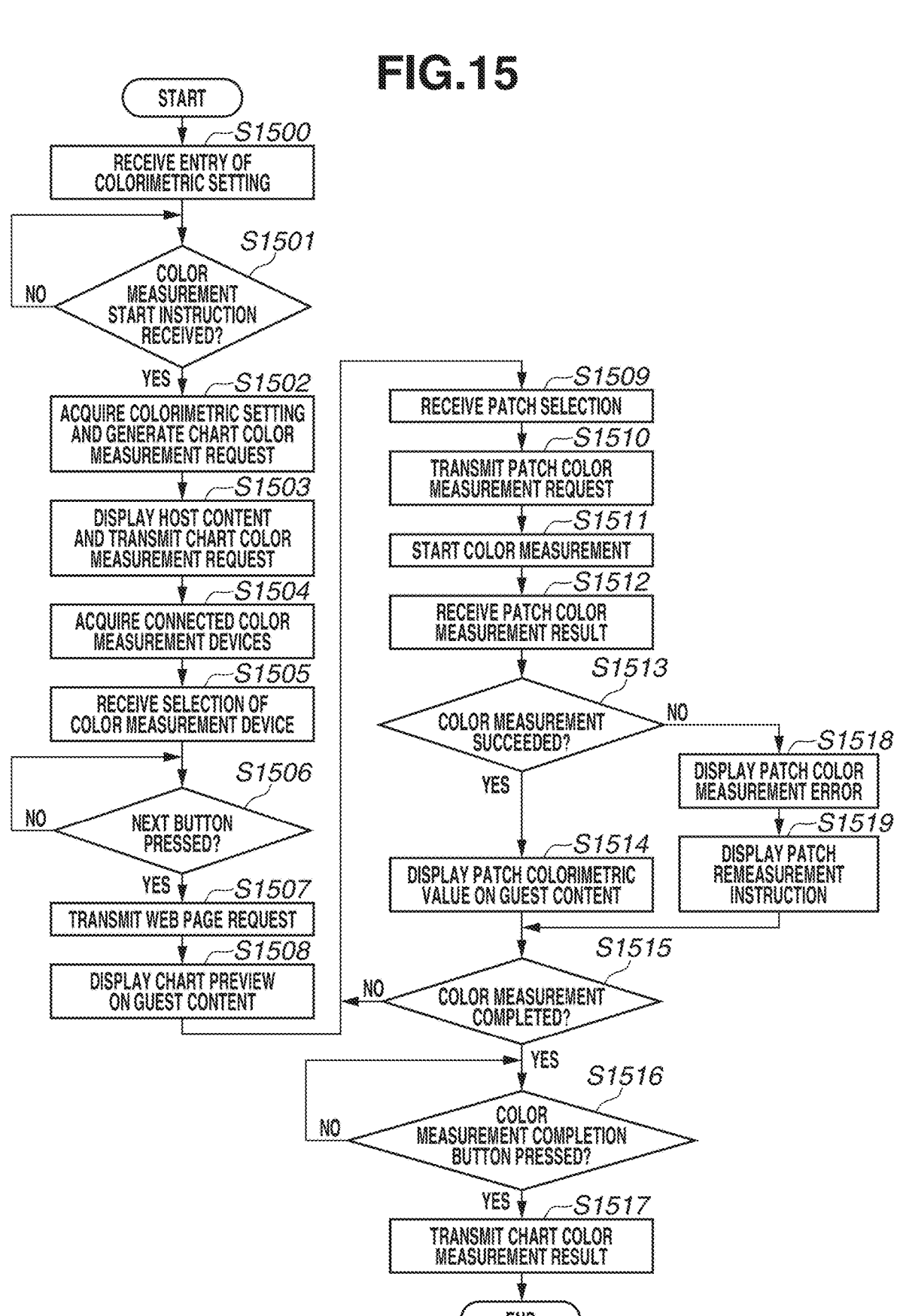
FIG. 15 is a flowchart illustrating color measurement processing according to the first exemplary embodiment.

FIG. 15 is a flowchart illustrating a flow of color measurement processing according to the present exemplary embodiment. The following processing is executed by the CPU 201 of the information processing apparatuses 102 and 104.

In step S1500, the color validation management unit 311 receives a color measurement start instruction issued by the user (press of the color measurement start button 603), from the web component 303.

In step S1501, the color validation management unit 311 determines whether a color measurement start instruction (color measurement instruction) has been received from the web component 303. In a case where a color measurement start instruction has been received (YES in step S1501), the processing proceeds to step S1502. In a case where a color measurement start instruction has not been received (NO in step S1501), the color validation management unit 311 waits for the reception of a color measurement start instruction without performing processing.

In step S1502, the color validation management unit 311 acquires the colorimetric setting 800 based on the identifier (000001) designated in the color measurement start instruction, from the colorimetric setting storage unit 312, and generates the chart color measurement request 1200. Then, the color validation management unit 311 delivers the chart color measurement request 1200 to the web server 310 together with the web page 302 of the color measurement device preparation screen in FIG. 6B.

In step S1503, the web server 310 transmits the web page 302 to the web browser 300, and the web browser 300 displays the web page 302. Furthermore, the web server 310 transmits the chart color measurement request 1200 in FIG. 12 to the web browser 300 together with the web page 302. In this example, only host content as illustrated in FIG. 4A is displayed. Specifically, the color measurement device preparation screen in FIG. 6B is displayed. Because the color measurement device preparation screen does not dynamically change in accordance with an operation of the color measurement device 107, only host content is displayed.

The web page 302 transmitted from the web server 310 also includes the web component 303. The web component 303 establishes connection with the color measurement control unit 304 at a timing at which the web page 302 is displayed on the web browser 300, and a state in which mutual communication is always enabled is caused. When the connection is established, the web component 303 delivers the chart color measurement request 1200 to the color measurement control unit 304.

In step S1504, the web component 303 acquires a list of color measurement devices managed by the color measurement control unit 304. The list of color measurement devices is displayed in the color measurement device selection portion 605 on the color measurement device preparation screen in FIG. 6B.

In step S1505, the web component 303 receives the selection of a color measurement device from the user.

In step S1506, the web component 303 determines whether the next button 609 has been pressed on the web page 302. In a case where the next button 609 has been pressed (YES in step S1506), the processing proceeds to step S1507.

In step S1507, the web component 303 communicates with the web server 310 and transmits a web page request for a chart color measurement screen to the web server 310. The web server 310 that has received the request transmits a web page generation request to the color validation management unit 311. The color validation management unit 311 generates a web page (chart color measurement screen in FIG. 6C) including host content displaying information for a color measurement work of a printed chart, and guest content displaying the chart preview 611. In generating the chart preview 611, the color validation management unit 311 uses the number of patch rows, the number of patches, and color signal values that are defined in the patch layout 803 of the colorimetric setting 800.

The web server 310 transmits the web page generated by the color validation management unit 311 to the web browser 300. Similarly to step S1503, the web page 302 includes the web component 303.

In step S1508, the web browser 300 displays the web page 302 received in step S1507. A portion on the chart color measurement screen that corresponds to the chart preview 611 is treated as guest content. Then, based on a message from the color measurement control unit 304, the web component 303 updates display of the chart preview 611 and controls a user operation on the chart preview 611.

In step S1509, the web component 303 receives a patch selection made by the user on the chart preview 611. A patch selected by the user becomes a color measurement target patch. For example, by selecting patches on a row in which "2:1" is described in FIG. 6C, the patches 612 are selected as a color measurement target.

In step S1510, the web component 303 transmits a patch color measurement request corresponding to the selected patch to the color measurement control unit 304. For example, the patch color measurement request 1300 in FIG. 13 is transmitted.

In step S1511, patch color measurement is performed by the user using the color measurement device 107, and the color measurement control unit 304 receives a colorimetric value from the color measurement device 107 via the color measurement device cooperation unit 306.

Then, the color measurement control unit 304 creates a color measurement result of the patch (e.g., the patch color measurement result 1301 in FIG. 13B), and transmits the color measurement result to the web component 303.

In step S1512, the web component 303 receives a patch color measurement result from the color measurement control unit 304.

In step S1513, the web component 303 performs determination processing of a color measurement result. Specifically, in a case where a color measurement result (Result) in the patch color measurement result 1301 is "true", the web component 303 determines that patch color measurement has succeeded (YES in step S1513), and the processing proceeds to step S1514. In a case where the color measurement result is "false", the web component 303 determines that patch color measurement has failed (NO in step S1513), and the processing proceeds to step S1518.

In step S1514, the web component 303 displays a colorimetric value (lab-value) of a patch color measurement result in each cell of a patch selected on the chart preview 611 being guest content.

In step S1515, the web component 303 determines whether color measurement of all patches has been completed, based on the chart preview 611. In a case where the web component 303 determines that color measurement of all patches has been completed (YES in step S1515), the processing proceeds to step S1516. In a case where the web component 303 determines that color measurement of all patches has not been completed (NO in step S1515), the processing returns to step S1509, and the selection of a next patch is received.

If color measurement of all patches corresponding to the number of patch rows described in the chart color measurement request 1200 has been completed, the color measurement control unit 304 generates the color measurement result 1400 in FIG. 14, and stores the color measurement result 1400 into the color measurement result storage unit 309.

In step S1516, the web component 303 determines whether a color measurement completion button has been pressed by the user. In a case where a color measurement completion button has been pressed (YES in step S1516), the web component 303 transmits the color measurement result transmission instruction 1901 as illustrated in FIG. 19B, to the color measurement control unit 304.

In step S1517, the color measurement control unit 304 acquires the color measurement result 1400 stored in the color measurement result storage unit 309, based on an identifier (000001) included in the color measurement result transmission instruction 1901, and transmits the color measurement result 1400 to the web server 310 via the color measurement communication unit 305. In the present exemplary embodiment, the color measurement control unit 304 transmits the color measurement result 1400 not via the web browser 300. When the color measurement control unit 304 transmits the color measurement result 1400 to the web server 310, the color measurement control unit 304 performs authentication using the authentication information 1201 in the chart color measurement request 1200, and after authentication has succeeded, the color measurement control unit 304 transmits the color measurement result 1400.

The web server 310 delivers the color measurement result 1400 to the color validation management unit 311. The color validation management unit 311 stores the color measurement result 1400 into the colorimetric setting storage unit 312 in association with the colorimetric setting 800 having the same identifier (000001).

In step S1518, the web component 303 displays a warning message of a patch color measurement error on the chart preview 611.

In step S1519, the web component 303 displays a patch remeasurement instruction on the chart preview 611.

An example of chart color measurement processing according to the present exemplary embodiment has been described above. As described using a specific example, in the chart color measurement according to the present exemplary embodiment, the web page 302 displayed on the web browser 300 includes host content and guest content (chart preview 611). The guest content is included in the host content. The host content is transmitted from the web server 310, and a guest content portion is not stationary display, and the display of the guest content is dynamically updated with data transmitted from the on-premise application 301.

Hereinafter, color validation processing according to the present exemplary embodiment will be described using a specific example.

After color measurement of a chart has been completed, color validation processing is started at a timing at which a color measurement result is stored into the colorimetric setting storage unit 312.

Figure 16:
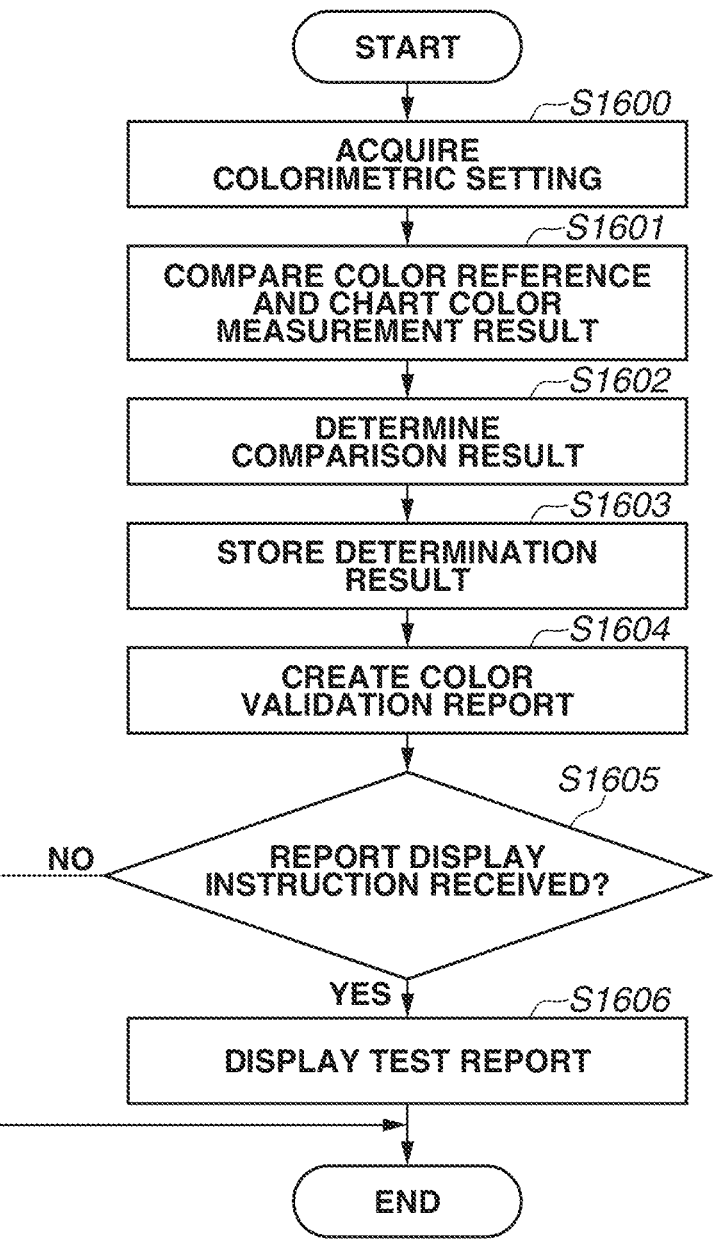
FIG. 16 is a flowchart illustrating color validation processing according to the first exemplary embodiment.

FIG. 16 is a flowchart illustrating a flow of color validation processing according to the present exemplary embodiment.

In step S1600, the color validation management unit 311 acquires, from the colorimetric setting storage unit 312, the colorimetric setting 800 including the same identifier as the identifier (000001) included in the color measurement result 1400, and delivers the color measurement result 1400 and the colorimetric setting 800 to the color validation processing unit 314.

In step S1601, the color validation processing unit 314 compares an expected value (CMYK signal value) of each patch that is defined in the patch layout 803 in the colorimetric setting 800, and a colorimetric value in the color measurement result 1400 obtained by performing color measurement of a printed chart using the color measurement device 107.

In step S1602, the color validation processing unit 314 performs pass or failure determination of a comparison result. Specifically, if a color difference falls within a threshold value, the color validation processing unit 314 determines that the comparison result has passed, and if a color difference falls outside the threshold value, the color validation processing unit 314 determines that the comparison result has failed.

In step S1603, the color validation processing unit 314 delivers the determination result to the color validation management unit 311, and the color validation management unit 311 stores the determination result into the colorimetric setting storage unit 312 in association with the colorimetric setting 800.

In step S1604, the color validation management unit 311 creates a color validation report based on the determination result, and stores the color validation report into the colorimetric setting storage unit 312.

In step S1605, the color validation management unit 311 determines whether the color validation result display button 701 has been pressed by the user. In a case where the color validation management unit 311 determines that the color validation result display button 701 has been pressed (YES in step S1605), the processing proceeds to step S1606.

In step S1606, the color validation management unit 311 transmits the designated color validation report to the web browser 300 as a web page via the web server 310. The web browser 300 displays the color validation report. This web page is displayed as illustrated in FIG. 7B.

As described above, by a program operating on a web browser and an on-premise application communicating, it becomes possible to control an image forming apparatus and a color measurement device by an operation of the web browser only.

Specifically, when a chart is printed in a color validation process, a web server directly transmits a print job of the chart to an on-premise application, and the on-premise application transfers the print job to an image forming apparatus. When color measurement of a chart is performed, a web browser acquires host content from the web server, and a program executed on the web browser updates the display of guest content by controlling a color measurement device via the on-premise application.

With this configuration, it is possible to provide the user with a color validation system operable by a web browser only, and enhance the convenience of the user on the web browser.

A second exemplary embodiment will be described. In the first exemplary embodiment, the description has been given of processing of receiving a patch color measurement result from an on-premise application by performing simple color measurement result determination processing in step S1513 at the time of chart color measurement. Nevertheless, for example, even if the web component 303 recognizes a row number of a patch selected by the user, the following problem might occur. More specifically, because a colorimetric value transmitted from the color measurement device 107 is a signal value obtained by scanning a patch on a printed chart, it is uncertain that the user has performed color measurement of a correct patch using the color measurement device 107, and a wrong patch colorimetric value might be displayed on the chart preview 611.

In view of the foregoing, when the preview of a chart to be displayed on guest content of the web page 302 is updated, it is desired that measurement result determination processing is performed on a selected color measurement target patch in more detail and a patch color measurement result is displayed at a correct position. In the second exemplary embodiment, characteristic processing to be performed when a patch color measurement result is displayed on chart preview of a web page will be described.

The description of items already described in the first exemplary embodiment will be omitted.

Figure 17:
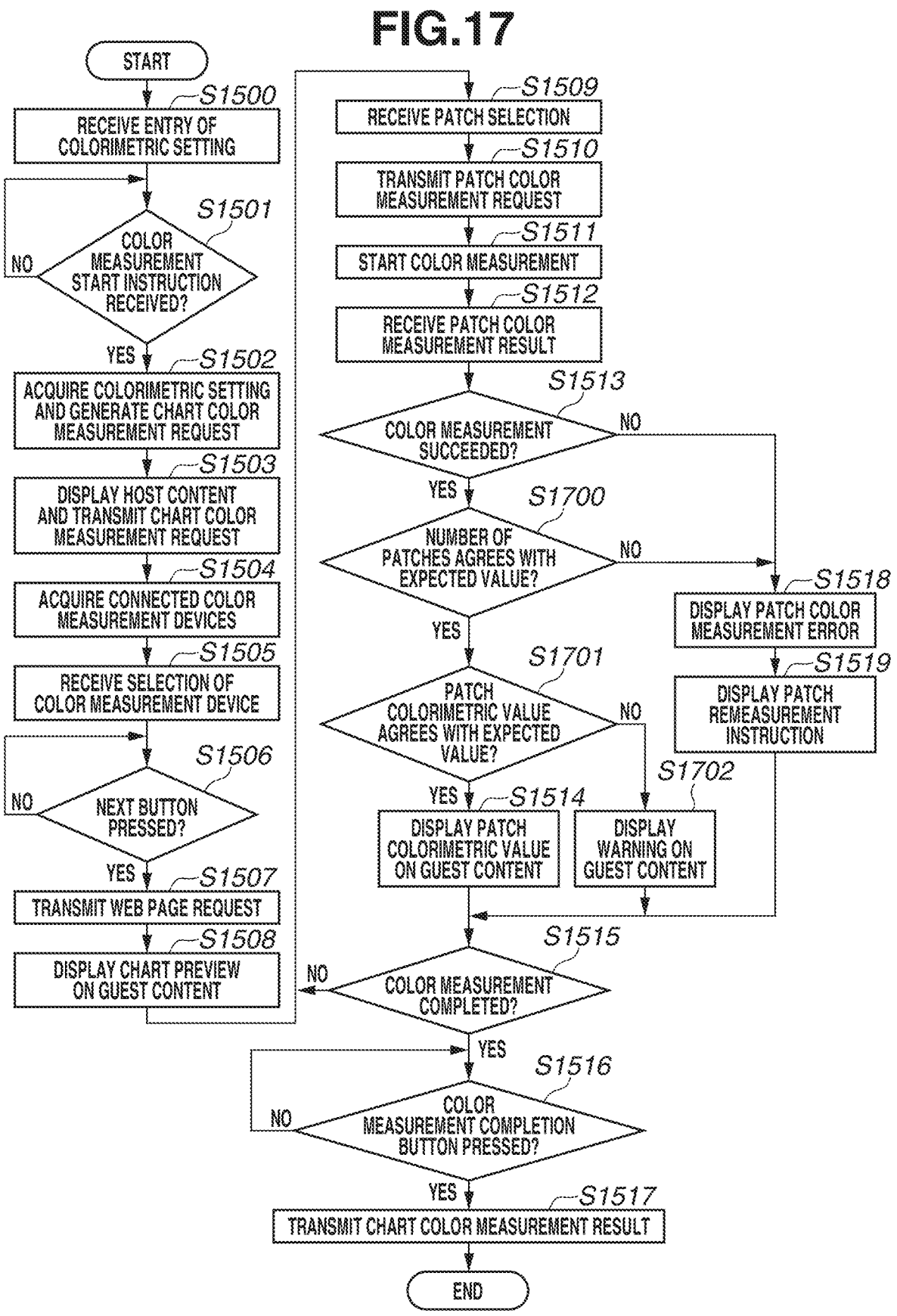
FIG. 17 is a flowchart illustrating color measurement processing according to a second exemplary embodiment.

FIG. 17 is a flowchart illustrating a flow of color measurement processing according to the second exemplary embodiment.

In step S1512, the web component 303 receives a patch color measurement result from the color measurement control unit 304. As described with reference to FIG. 13B, the patch color measurement result includes a colorimetric value of a patch scanned using the color measurement device 107. Utilizing the colorimetric value of the patch, the following processing is performed.

In step S1700, the web component 303 acquires a colorimetric value in the patch color measurement result 1301, and determines whether the number of patches agrees with an expected value. Specifically, the web component 303 counts the number of patches included in a colorimetric value in the patch color measurement result 1301. Then, based on a row number in a patch color measurement request transmitted in step S1510, the web component 303 identifies the number of patches (expected value) described in a patch layout of the chart color measurement request 1200 in FIG. 12, and compares the number of patches with the number of patches in the colorimetric value obtained this time.

In a case where the numbers of patches agree with each other as a result of comparison, the web component 303 determines that a correct number of patches have been scanned (YES in step S1700), and the processing proceeds to step S1701. In a case where the numbers of patches do not agree with each other, the web component 303 determines that a wrong patch has been scanned (NO in step S1700), and the processing proceeds to step S1518.

In step S1701, the web component 303 checks a colorimetric value in the patch color measurement result 1301, and determines whether the colorimetric value agrees with an expected value of a patch selected by the user. Specifically, based on a row number in the patch color measurement request transmitted in step S1510, the web component 303 identifies an expected value of a patch described as an expected value of the entire chart in the chart color measurement request 1200 in FIG. 12, and compares the expected value with a colorimetric value obtained this time.

In a case where the colorimetric value of the patch agrees with the expected value as a result of comparison (YES in step S1701), the web component 303 advances the processing to step S1514. In a case where the colorimetric value of the patch does not agree with the expected value (NO in step S1701), the web component 303 advances the processing to step S1702.

In step S1702, the web component 303 displays a warning message indicating that a colorimetric value does not agree with an expected value, on the chart preview 611, which is guest content. In this step, a warning message is displayed, not an error message. A patch remeasurement instruction is not immediately displayed (S1519). This is because it is not necessarily appropriate to suggest that color measurement of a wrong patch has been performed, since an illumination environment in color measurement might have been bad, or a printed chart might have been stained. On the other hand, in a case where it is determined in step S1700 that the numbers of patches do not agree with each other, it can be surely determined that color measurement of a wrong patch has been performed.

Because the chart color measurement request 1200 and the patch color measurement request 1300 are delivered from the web component 303 to the color measurement control unit 304, the above-described processing can also be executed by the color measurement control unit 304. Even when the processing is performed by the color measurement control unit 304, the characteristics of the present disclosure do not change. In a case where the above-described processing is performed by the color measurement control unit 304, the web component 303 is used to make determination by viewing only a value described in the Result in the patch color measurement result.

As described above, by executing the processing in steps S1700, S1701, and S1702, it can be guaranteed that color measurement of a patch selected by the user has been surely performed.

In other words, based on a row number of a selected patch, success or failure of a color measurement operation of a patch selected by the user is determined through a two-step process using the number of patches and an expected value. With this configuration, the web component 303 can display a patch color measurement result of a color measurement target patch at a correct position.

In the first exemplary embodiment, an example of the single scan for performing patch color measurement only once has been described.

In a third exemplary embodiment, an example of dual scan for performing a patch color measurement operation twice will be described. In a case where dual scan is performed, by the color measurement control unit 304 simply transmitting a colorimetric value obtained from the color measurement device 107, to the web component 303, the web component 303 updates the chart preview 611 many times. Then, only a patch color measurement result transmitted last is displayed.

Figure 18:
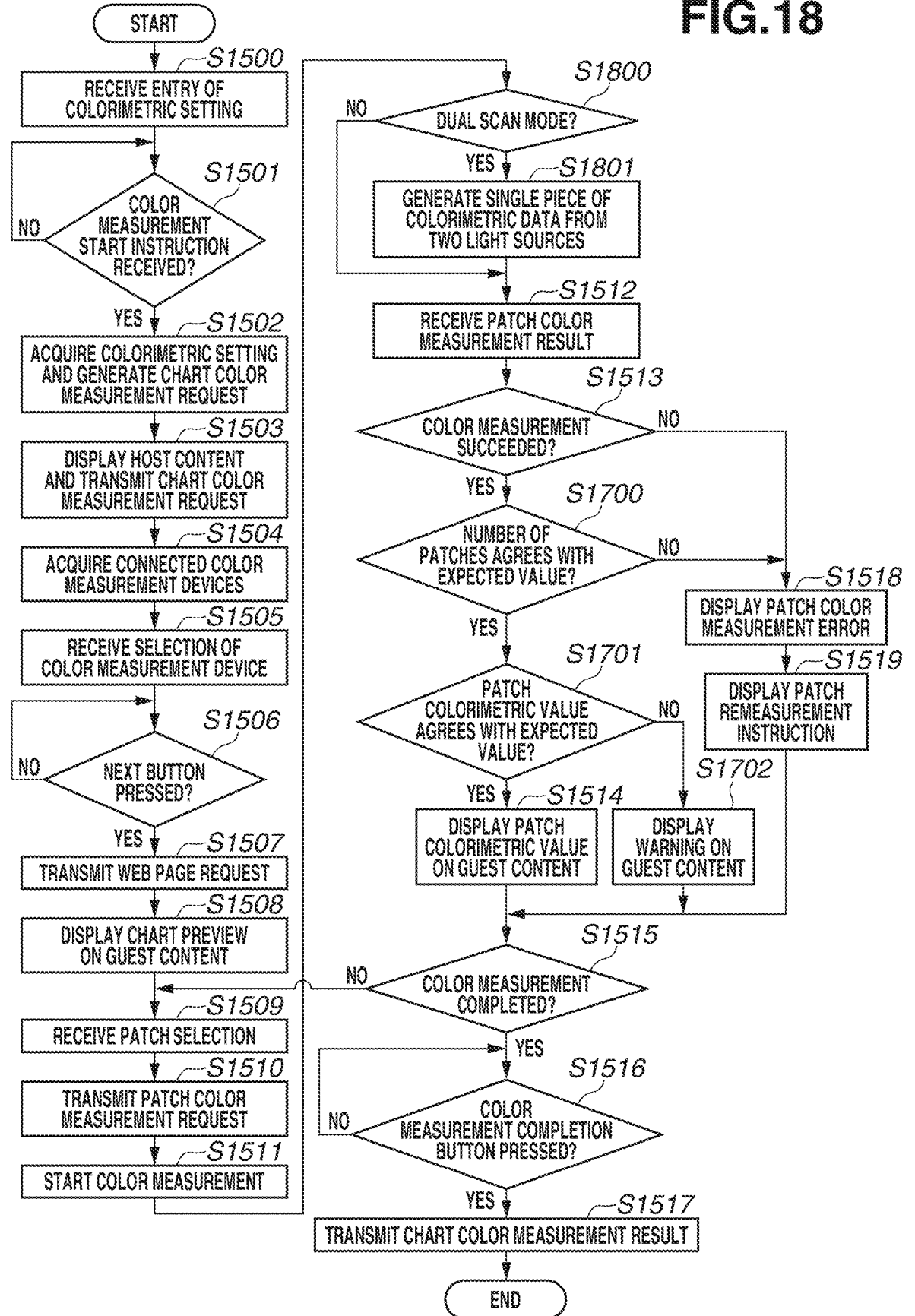
FIG. 18 is a flowchart illustrating color measurement processing according to a third exemplary embodiment.

In view of the foregoing, in the third first exemplary embodiment, characteristic processing to be performed in dual scan will be described. FIG. 18 is a flowchart illustrating color measurement processing according to the third exemplary embodiment.

In step S1800, the color measurement control unit 304 checks a scan mode of the chart color measurement request 1200. In a case where a scan mode is dual scan (YES in step S1800), the color measurement control unit 304 advances the processing to step S1801.

In step S1801, the color measurement control unit 304 receives a colorimetric value from the color measurement device 107. Even if the color measurement control unit 304 receives a colorimetric value, the color measurement control unit 304 does not immediately transmit the colorimetric value to the web component 303, and receives colorimetric values corresponding to two times, from the color measurement device 107. Then, based on the colorimetric values corresponding to two times, the color measurement control unit 304 creates a value resultant from pseudo spectrometry with an M1 factor (illumination with UV power of D50). In the present exemplary embodiment, data corresponding to a light source with an M1 factor is created, but a light source may be created under another condition such as an M0 factor, for example, depending on the intended purpose of the system. Furthermore, a condition such as M1 and M0 may be made changeable by a setting.

As described above, a patch color measurement operation is performed twice in dual scan, but instead of transmitting scan data corresponding to two times, data corresponding to a light source with an M1 factor is created from two pieces of scan data and then the data is transmitted. With this configuration, the web component 303 can display a patch color measurement result once instead of displaying a patch color measurement result on the chart preview 611 twice.

According to the exemplary embodiment described above, at the time of chart color measurement, a web browser acquires host content from a web server. A program executed on the web browser updates the display of guest content by controlling a color measurement device via an on-premise application. On the other hand, at the time of chart printing, print data is not transmitted to an image forming apparatus via the web browser. With this configuration, in a color validation system that uses a web browser, the convenience of the user can be enhanced.

According to the exemplary embodiments described above, the convenience of the user can be enhanced in a series of operations related to color validation.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors, circuitry, or combinations thereof (e.g., central processing unit (CPU), micro processing unit (MPU), or the like) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), Blu-ray Disc (BD), or other optical disk), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An information processing system, comprising:

at least one processor and at least one memory coupled to the at least one processor and having instructions stored thereon, and when executed by the at least on processor, acting as:

a providing unit configured to provide, to an external apparatus connected via a network, screen information for displaying a setting screen which includes a first display item for receiving a user operation to instruct printing of a chart to be used in color validation, and first information, second information, and third information associated with each of a plurality of selectable colorimetric settings, wherein the first information represents a color reference to be used in the color validation, the second information represents an image forming apparatus that is target for color verification using each color reference and the third information represents a print condition of a chart for color verification using each color reference;

a receiving unit configured to receive a printing instruction transmitted form the external apparatus in accordance with the user operation on the first display item displayed on a screen of the external apparatus;

a generation unit configured to, on a basis of the printing instruction received by the receiving unit, generate a print job for printing a chart which satisfies a colorimetric setting selected by a user in the setting screen;

a transmitting unit configured to transmit the print job generated by the generation unit to an image forming apparatus; and an executing unit configured to execute the color validation by comparing a result of color measurement of the chart, the result being acquired from the external apparatus, with the selected color reference.

2. The information processing system according to claim 1, wherein the providing unit is further configured to provide, to the external apparatus, a screen that shows a result of the color validation executed by the executing unit.

3. The information processing system according to claim 1, wherein the third information indicates a medium type as a print condition of a chart for color verification using each color reference.

4. The information processing system according to claim 1, wherein the setting screen includes an item of setting a color measurement device to be used for color verification using specific color reference.

5. The information processing system according to claim 1, wherein the setting screen includes an item of setting a printer to be used for color verification using specific color reference.

6. The information processing system according to claim 1, wherein the information processing system is a Web system.

7. The information processing system according to claim 1, wherein the providing unit provides the screen information for displaying the setting screen as information for displaying a Web page.

8. The information processing system according to claim 1, wherein the setting screen is displayed in the external apparatus using a Web browser based on the screen information.

9. The information processing system according to claim 1, wherein the setting screen includes both of the second information and the third information.

10. The information processing system according to claim 1, wherein the printing instruction is associated with an identifier which corresponds to the colorimetric setting selected by the user on the setting screen.

11. The information processing system according to claim 10, wherein the generation unit generates, from among the plurality of colorimetric settings managed by the information processing system, a chart having a number of rows and a number of columns set in the colorimetric setting that corresponds to the identifier associated with the printing instruction, and a print job including a print condition associated with a color reference set in the colorimetric setting that corresponds to the identifier.

12. The information processing system according to claim 11, wherein the print condition is described in a job definition format (JDF) in the print job.

13. The information processing system according to claim 11, wherein the print condition is at least one of sheet type, sheet grammage and resolution.

14. An information processing method, comprising:

providing, to an external apparatus connected via a network, screen information for displaying a setting screen which includes a first display item for receiving a user operation to instruct printing of a chart to be used in color validation, and first information, second information, and third information associated with each of a plurality of selectable colorimetric settings, wherein the first information represents color reference to be used in the color validation, the second information represents an image forming apparatus that is target for color verification using each color reference and the third information represents a print condition of a chart for color verification using each color reference;

receiving a printing instruction transmitted form the external apparatus in accordance with the user operation on the first display item displayed on a screen of the external apparatus;

generating, on a basis of the received printing instruction, a print job for printing a chart which satisfies a colorimetric setting selected by a user in the setting screen;

transmitting the generated print job to an image forming apparatus; and executing the color validation by comparing a result of color measurement of the chart, the result being acquired from the external apparatus, with the selected color reference.

15. The information processing method according to claim 14, further comprising:

providing, to the external apparatus, a screen that shows a result of the executed color validation.

16. The information processing method according to claim 14, wherein the third information indicates a medium type as a print condition of a chart for color verification using each color reference.

17. The information processing method according to claim 14, wherein the setting screen includes an item of setting a color measurement device to be used for color verification using specific color reference.

18. The information processing method according to claim 14, wherein the setting screen includes an item of setting a printer to be used for color verification using specific color reference.

19. A non-transitory computer-readable storage medium storing a program readable by a computer for causing the computer to function as an information processing system, the information processing system comprising:

at least one processor and at least one memory coupled to the at least one processor and having instructions stored thereon, and when executed by the at least on processor, acting as:

a providing unit configured to provide, to an external apparatus connected via a network, screen information for displaying a setting screen which includes a first display item for receiving a user operation to instruct printing of a chart to be used in color validation, and first information, second information, and third information associated with each of a plurality of selectable colorimetric settings, wherein the first information represents a color reference to be used in the color validation, the second information represents an image forming apparatus that is target for color verification using each color reference and the third information represents a print condition of a chart for color verification using each color reference;

a receiving unit configured to receive a printing instruction transmitted form the external apparatus in accordance with the user operation on the first display item displayed on a screen of the external apparatus;

a generation unit configured to, on a basis of the printing instruction received by the receiving unit, generate a print job for printing a chart which satisfies a colorimetric setting selected by a user in the setting screen;

a transmitting unit configured to transmit the print job generated by the generation unit to an image forming apparatus; and an executing unit configured to execute the color validation by comparing a result of color measurement of the chart, the result being acquired from the external apparatus, with the selected color reference.

* * * * *